(12) United States Patent
Okano

(10) Patent No.: US 9,195,430 B2
(45) Date of Patent: Nov. 24, 2015

(54) IMAGE DISPLAY TERMINAL, IMAGE DISPLAY CONTROL METHOD AND RECORDING MEDIUM RECORDING IMAGE DISPLAY CONTROL PROGRAM

(75) Inventor: Mitsuru Okano, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 549 days.

(21) Appl. No.: 13/589,515

(22) Filed: Aug. 20, 2012

(65) Prior Publication Data

US 2013/0050064 A1 Feb. 28, 2013

(30) Foreign Application Priority Data

Aug. 30, 2011 (JP) ................. 2011-186669

(51) Int. Cl.
*G06F 3/14* (2006.01)
*G06F 15/02* (2006.01)
*G09G 5/14* (2006.01)
*G09G 5/20* (2006.01)

(52) U.S. Cl.
CPC ............ *G06F 3/1462* (2013.01); *G06F 3/1415* (2013.01); *G06F 3/1454* (2013.01); *G06F 15/02* (2013.01); *G09G 5/14* (2013.01); *G09G 5/20* (2013.01); *G09G 2340/04* (2013.01); *G09G 2370/06* (2013.01); *G09G 2370/16* (2013.01)

(58) Field of Classification Search
CPC .... G06T 11/206; G06F 3/1462; G06F 3/1415
USPC ......................................................... 345/2.2
See application file for complete search history.

(56) References Cited

U.S. PATENT DOCUMENTS

| 5,836,666 A * | 11/1998 | Aoyama et al. ................. 353/122 |
| 2001/0035913 A1* | 11/2001 | Shtyrenkov ..................... 348/552 |
| 2002/0180777 A1* | 12/2002 | Kusumoto et al. ............. 345/733 |

(Continued)

FOREIGN PATENT DOCUMENTS

| EP | 2 369 578 A2 | 9/2011 |
| JP | 07-162826 A | 6/1995 |

(Continued)

OTHER PUBLICATIONS

Extended European Search Report (EESR) dated Jan. 8, 2013 (in English) issued in counterpart European Application No. 12179682.5.

*Primary Examiner* — Claire X Pappas
*Assistant Examiner* — Robert Stone
(74) *Attorney, Agent, or Firm* — Holtz, Holtz, Goodman & Chick PC

(57) ABSTRACT

An image display terminal includes an image display control unit, a display range setting unit, a display range sending unit and a graph expression receiving unit. The image display control unit displays a background image in a display screen. The display range setting unit sets display range data of a coordinate system to an image display region of the display screen. The display range sending unit sends the display range data to at least one other image display terminal which displays the background image displayed on the image display terminal. After the display range data is set to an image display region of the other image display terminal, the graph expression receiving unit receives, from the other image display terminal, graph expression data for a graph figure displayed on the image display region of the other image display terminal.

8 Claims, 10 Drawing Sheets

(56) References Cited

U.S. PATENT DOCUMENTS

| | | |
|---|---|---|
| 2003/0177501 A1 | 9/2003 | Takahashi et al. |
| 2004/0227738 A1* | 11/2004 | Sudoh ............................ 345/173 |
| 2006/0136191 A1* | 6/2006 | Irons ................................ 703/24 |
| 2006/0253534 A1* | 11/2006 | Milheron et al. ............. 709/205 |
| 2007/0188496 A1* | 8/2007 | Igusa ............................ 345/440 |
| 2008/0136821 A1* | 6/2008 | Okano et al. ................. 345/440 |
| 2009/0254597 A1* | 10/2009 | Karoji ........................... 708/130 |
| 2010/0138780 A1 | 6/2010 | Marano et al. |
| 2011/0234596 A1 | 9/2011 | Okano |
| 2011/0254862 A1* | 10/2011 | Okano ........................... 345/634 |
| 2012/0162063 A1* | 6/2012 | Uejima ......................... 345/156 |
| 2012/0242690 A1* | 9/2012 | Yamaguchi ................... 345/629 |
| 2012/0284644 A1* | 11/2012 | Sitrick et al. ................. 715/753 |

FOREIGN PATENT DOCUMENTS

| | | |
|---|---|---|
| JP | 2003-216588 A | 7/2003 |
| JP | 2007-304656 A | 11/2007 |
| WO | WO 2009/143294 A2 | 11/2009 |

* cited by examiner

IMAGE DISPLAY TERMINAL, IMAGE DISPLAY CONTROL METHOD AND RECORDING MEDIUM RECORDING IMAGE DISPLAY CONTROL PROGRAM

BACKGROUND OF THE INVENTION

1. Field of the Invention

The present invention relates to an image display terminal, an image display control method, and a recording medium which records an image display control program therein.

2. Description of the Related Art

Conventionally, in an image display terminal which displays picked-up images, measurement data of a moving object is drawn as a graph with a picked-up image of the moving object displayed as the background so that the shape of the graph and a physical event are correlated with each other for study.

Such image display terminals are currently used in class, and when a student draws a graph on his/her terminal, the same graph is displayed on a teacher's terminal.

BRIEF SUMMARY OF THE INVENTION

However, according to the image display terminals described above, if a display range of an XY coordinate system of the teacher's terminal is different from that of the student' terminal, even when a graph fitting a background image is displayed on the student's terminal, the graph does not fit the background image on the teacher's terminal.

Objects of the present invention are to provide an image display terminal, an image display control method, and a recording medium which records an image display control program therein, with which, when a graph fitting a background image is received, the graph can be properly displayed in such a way as to fit the same background image.

In order to achieve at least one of the objects described above, according to a first aspect of the present invention, there is provided an image display terminal including: an image display control unit which displays a background image in a display screen of the image display terminal; a display range setting unit which sets, with respect to a coordinate system determined by a plurality of coordinate axes, display range data to an image display region where the background image is displayed of the display screen; a display range sending unit which sends the set display range data to at least one other image display terminal; and a graph expression receiving unit which receives from the other image display terminal, after the sent display range data is set to an image display region where the background image is displayed of the other image display terminal, graph expression data for a graph figure displayed on the background image of the other image display terminal, wherein the background image displayed on the image display terminal and the background image displayed on the other image display terminal are identical.

According to a second aspect of the present invention, there is provided an image display terminal including: an image display control unit which displays a background image in a display screen of the image display terminal; a display range receiving unit which receives, from another image display terminal, with respect to a coordinate system determined by a plurality of coordinate axes, display range data set by the another image display terminal; a received display range setting unit which sets the received display range data to an image display region where the background image is displayed of the display screen; a graph expression input unit which inputs graph expression data fitting the background image on the basis of a user operation, after the received display range data is set to the image display region; and a graph expression sending unit which sends the inputted graph expression data to the another image display terminal, wherein the background image displayed on the image display terminal and a background image displayed on the another image display terminal are identical.

DETAILED DESCRIPTION OF THE INVENTION

In the following, referring to the accompanying drawings, an embodiment of the present invention is described. However, the present invention is not limited to the drawings or the embodiment.

[1. Configuration of Scientific Calculator]

[1-1. External Appearance]

Figure 1:
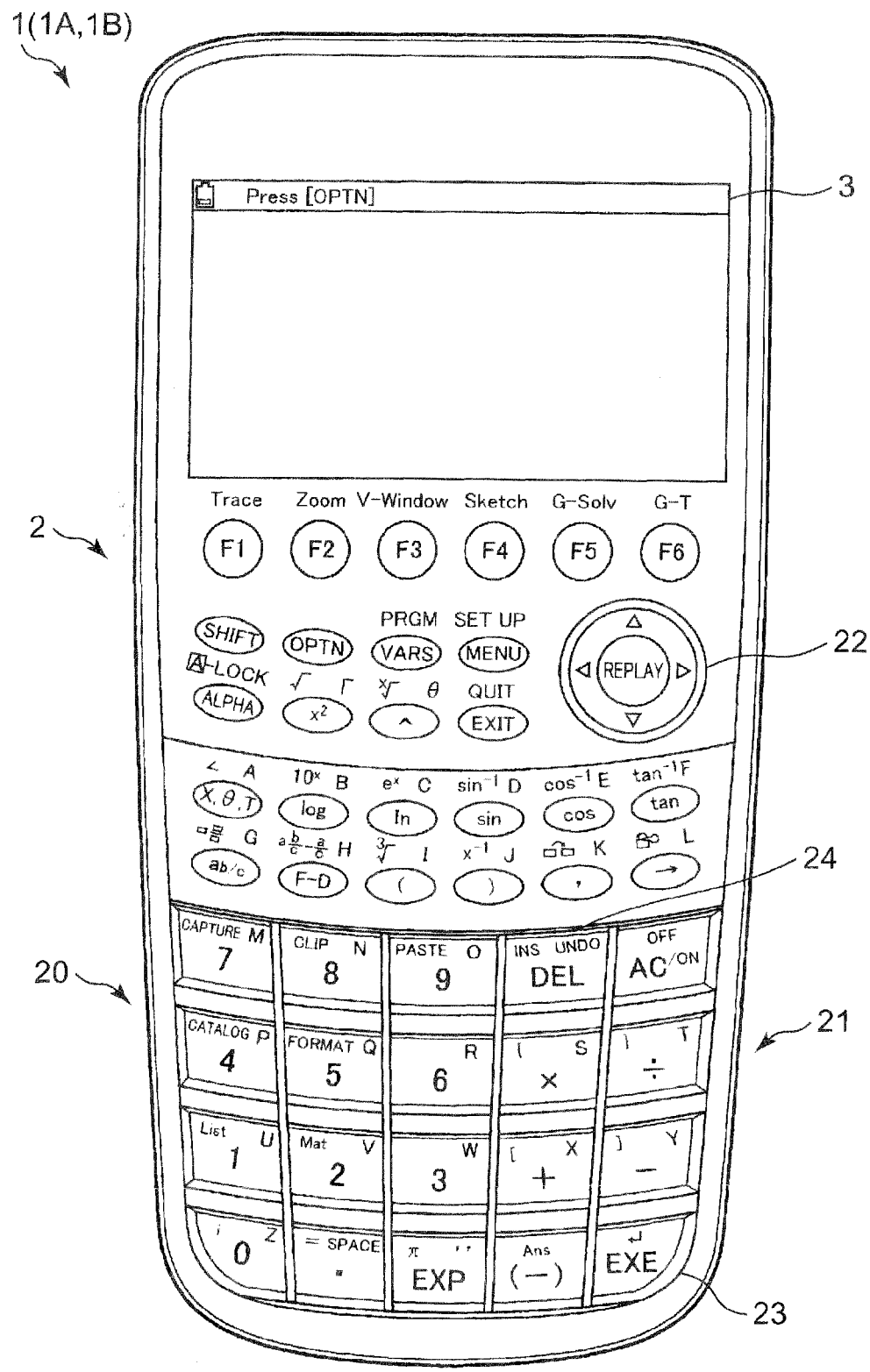
FIG. 1 is a plan view schematically showing the configuration of a scientific calculator.

FIG. 1 is a conceptual diagram schematically showing the configuration of a scientific calculator 1.

As shown in FIG. 1, the scientific calculator 1 includes an input key set 2 having various keys, and a display 3.

The input key set 2 is a key set to receive input operations for expression elements such as numeral values and operators, and to receive instruction operations for various types of processing. The input key set 2 includes keys to which functions are respectively assigned. In the embodiment, the input key set 2 includes a numeric keypad 20, operator keys 21, a cursor key 22, an EXE (executor) key 23, and a DEL (delete) key 24.

The numeric keypad 20 receives input operations to input numeral values. The operator keys 21 receive input operations to input various operators such as four arithmetic operators and brackets.

The cursor key 22 is pressed, for example, to move a cursor in a predetermined direction. The cursor indicates a position of a target for editing or a position of a target for selection in the display 3. In the embodiment, the cursor key 22 is configured to be able to input four directions, up, down, left and right.

The EXE key 23 receives input operations to input execution instructions to perform processing and to input decision instructions. The EXE key 23 functions, for example, as a key to instruct to perform arithmetic processing after a graph expression is inputted. The DEL key 24 receives delete operations to delete numeral values, operators or the like displayed on the display 3.

The display 3 is constituted of an LCD (Liquid Crystal Display), an ELD (Electronic Luminescent Display) or the like. The display 3 displays letters, symbols, expressions, results of arithmetic, coordinate axes, graphs and the like in response to operations on the input key set 2 or the like, and also displays various data necessary to use the scientific calculator 1, with a plurality of dots. On the display 3 in the embodiment, an X axis and a Y axis are displayed in the lateral direction and the longitudinal direction, respectively, so as to display an XY coordinate system determined by the X axis and the Y axis. In addition, the display 3 is provided with a touch panel 30 to be integrated therewith allover the display screen thereof.

[1-2. Functional Configuration]

Next, the functional configuration of the scientific calculator 1 is described.

Figure 2:
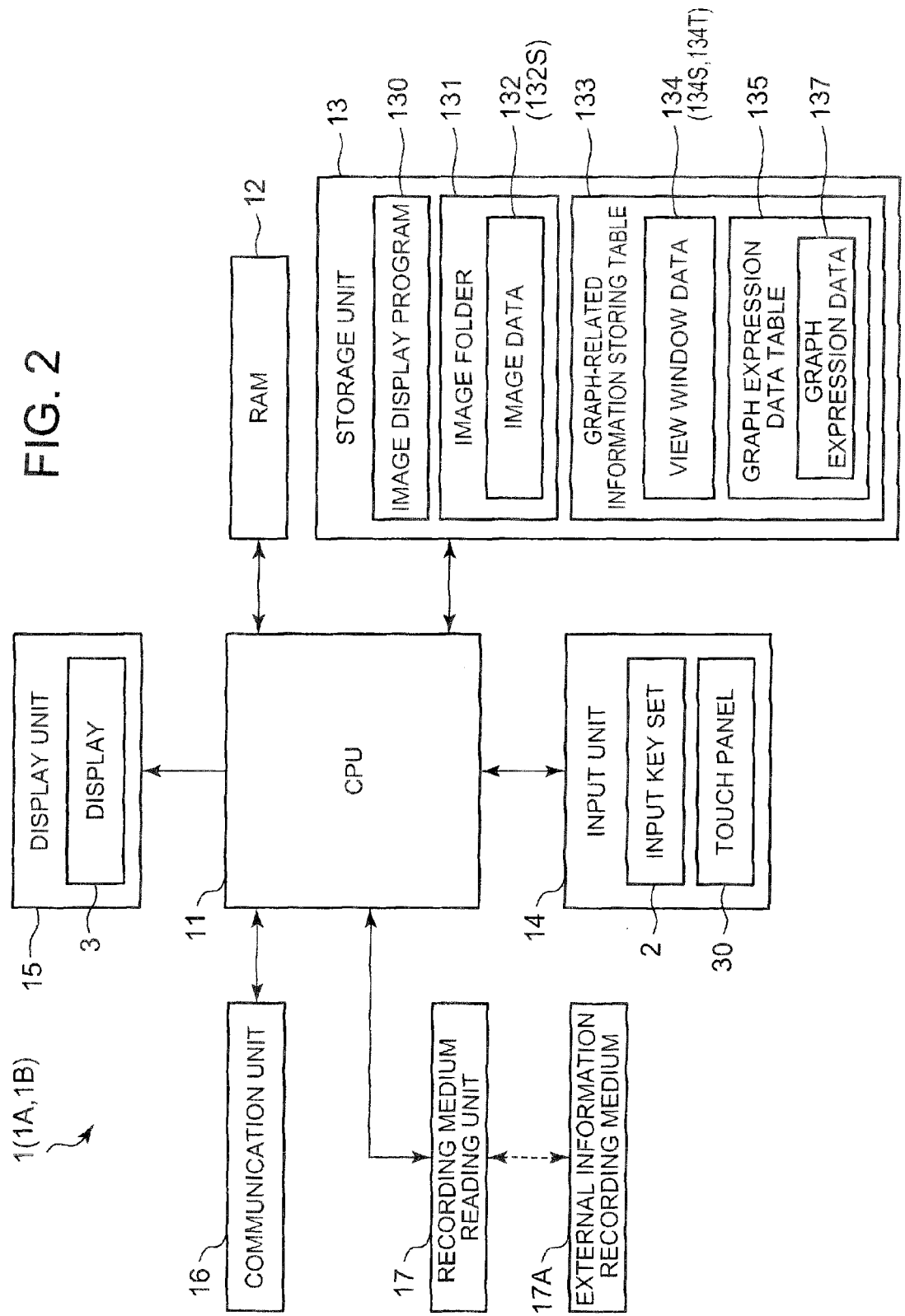
FIG. 2 is a block diagram showing the functional configuration of the scientific calculator.

FIG. 2 is a block diagram schematically showing the functional configuration of the scientific calculator 1.

As shown in FIG. 2, the scientific calculator 1 includes an input unit 14, a display unit 15, a communication unit 16, a recording medium reading unit 17, a RAM (Random Access Memory) 12, a storage unit 13, and a CPU (Central Processing Unit) 11.

The input unit 14 includes the input key set 2 and the touch panel 30, and outputs signals corresponding to pressed keys or pressed points on the touch panel 30 to the CPU 11.

The display unit 15 includes the display 3, and displays various pieces of information in accordance with display signals from the CPU 11.

The communication unit 16 is connectable to the Internet, thereby being communicable with external devices connected to the Internet.

The recording medium reading unit 17 reads information from an external information recording medium 17A, which is attached to the recording medium reading unit 17 freely detachably, such as a USB memory.

The RAM 12 is a volatile memory which temporarily stores information, and has a plurality of work areas where various programs to be executed, data for the various programs, and the like are stored.

The storage unit 13 is a nonvolatile memory constituted of a ROM (Read Only Memory) or the like, and stores various programs and data. More specifically, the storage unit 13 stores an image display program 130 (an image display control program) as a program of the present invention, an image folder 131, and a graph-related information storing table 133.

The image display program 130 is a program to make the CPU 11 perform image display processing (shown in FIGS. 3 and 4) described below.

The image folder 131 includes a plurality of image data 132 on background images displayable on the display 3. Each image data 132 is data on a background image displayable in such a way that the background image and a coordinate system are superimposed on each other. The image data 132 shows a predetermined shape (a parabola or a straight line, for example) which can be approximated by a graph. As the image of the image data 132, an image different from an actual event, such as a drawn image, may be used. Furthermore, the predetermined shape which can be approximated by a graph is not limited to a parabola or a straight line, and hence may be another shape. The image data 132 are received via the communication unit 16.

The graph-related information storing table 133 stores a plurality of pieces of information on graph figures displayed in image display processing (shown in FIGS. 3 and 4) described below correlated with numbers of storage regions (region numbers, hereinbelow). More specifically, the graph-related information storing table 133 stores, as each piece of the information, view window data 134 and a graph expression data table 135 which are correlated with each other.

The view window data 134 is information on a display mode of an XY coordinate system. In the embodiment, the view window data 134 includes a display range of the XY coordinate system (the largest and smallest coordinate values of an X axis and a Y axis, i.e. Xmin, Xmax, Ymin, and Ymax), a space between scales on each coordinate axis (Xscl and Yscl), and the like.

The graph expression data table 135 stores at least one set of graph expression data 137, terminal identification information (a user name in the embodiment) of the scientific calculator 1 by which the graph expression data 137 is created, and an expression number, which are correlated with each other.

The graph expression data 137 is data on an approximate graph fitting a shape shown by the image of the image data 132. The graph expression data 137 indicates a type of an approximate graph and a graph expression for the approximate graph. The type of an approximate graph includes a straight line, a two-dimensional curve, a three-dimensional curve, a logarithmic graph, and an exponential graph.

The CPU 11 performs central control over the components of the scientific calculator 1. More specifically, the CPU 11 loads programs specified from among system programs and various application programs stored in the storage unit 13 into the RAM 12, and performs processing in cooperation with the programs loaded into the RAM 12.

In class, a plurality of scientific calculators 1 is used by a teacher and students at once. In the following, the scientific calculator 1 used by a teacher is referred to as a scientific calculator 1A as a primary terminal, and the scientific calculator 1 used by each student is referred to as a scientific calculator 1B as a secondary terminal. Whether a scientific calculator 1 is a primary terminal or a secondary terminal may be set before being marketed, or may be set by a user after purchase. The scientific calculator 1B has only one storage region in the graph-related information storing table 133.

[2. Operation of Scientific Calculator]

Figure 3:
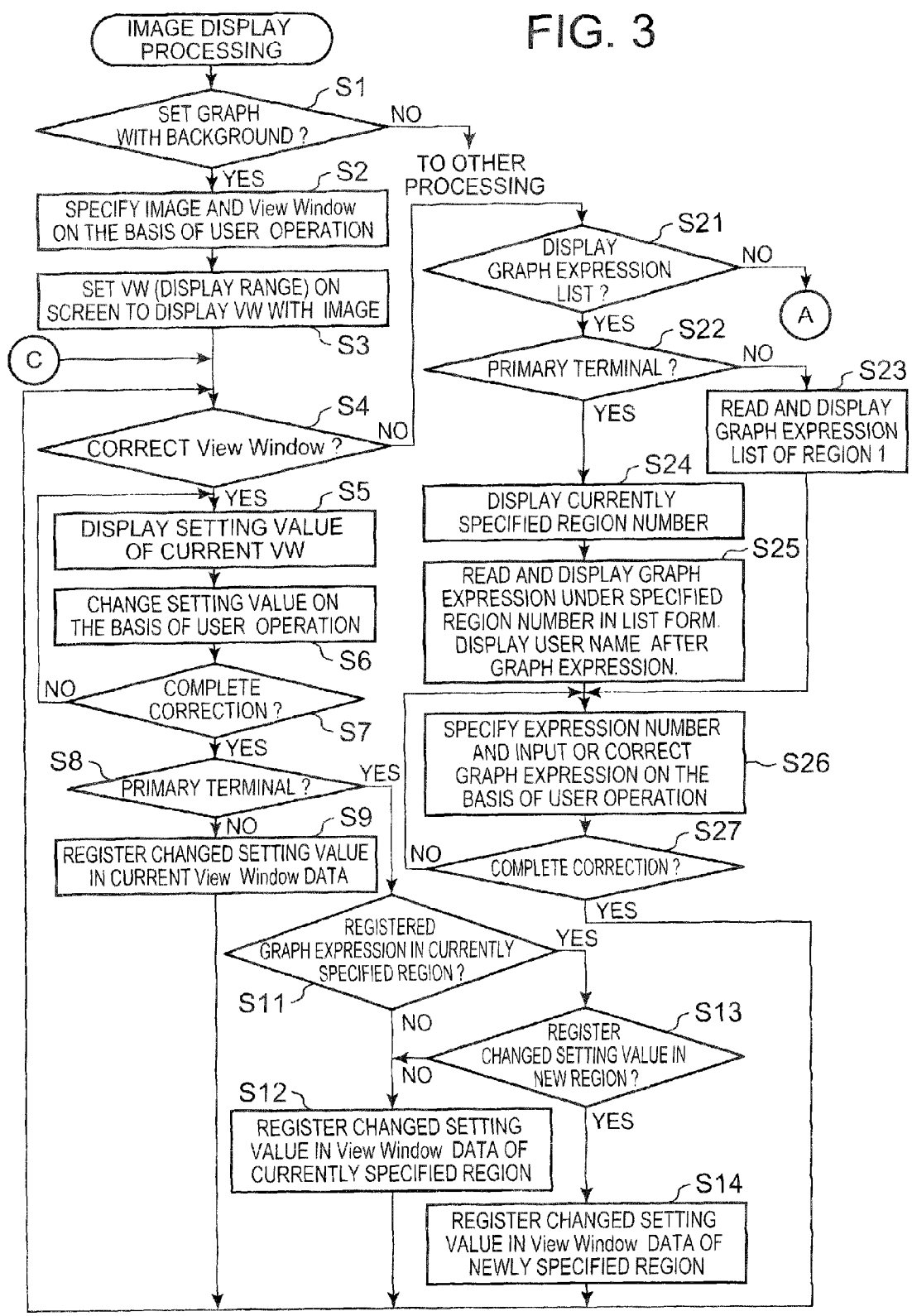
FIG. 3 is a first part of a flowchart of image display processing.
Figure 4:
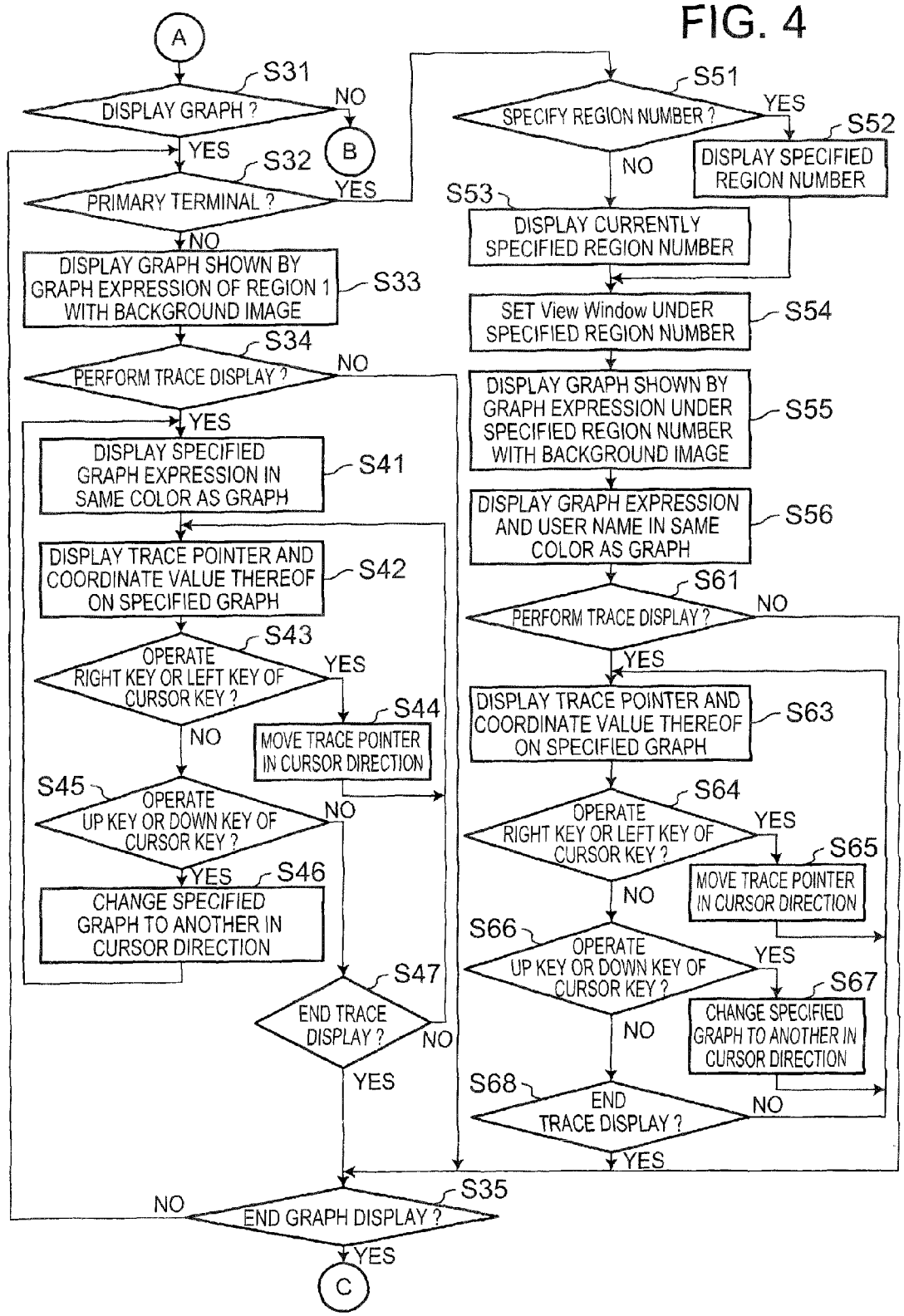
FIG. 4 is a second part of the flowchart of the image display processing.

Next, operation of the scientific calculator 1 is described, referring to FIGS. 3 and 4.

FIGS. 3 and 4 show a flowchart to explain the image display processing performed by the CPU 11 reading the image display program 130 from the storage unit 13.

As shown in FIG. 3, in the image display processing, the CPU 11 first determines whether or not a setting operation to display a graph figure with a background image is performed (Step S1). When determining that the setting operation is not performed (Step S1; NO), the CPU 11 moves to other processing.

On the other hand, when determining that the setting operation is performed (Step S1; YES), the CPU 11 specifies, on the basis of a user operation, one image data 132 in the image folder 131 as specified image data 132S, one region number in the graph-related information storing table 133 as a specified region number, and view window data 134 under the specified region number as specified view window data 134S (Step S2).

Next, the CPU 11 displays the image of the specified image data 132S on the display 3, and sets, with respect to the XY coordinate system, display range data of the XY coordinate system shown by the specified view window data 134S onto an image display region where an image is displayed of the display screen (Step S3). If the scientific calculator 1 to which the CPU 11 belongs (its scientific calculator 1, hereinbelow) is the scientific calculator 1A, the CPU 11 makes the scientific calculator 1B display the same image, namely, the image of the specified image data 132S, on the display 3, and set, with respect to the XY coordinate system, the display range data of the XY coordinate system shown by the specified view window data 134S onto the image display region.

Next, the CPU 11 determines whether or not an operation to correct the specified view window data 134S is performed (Step S4). When determining that the operation is performed (Step S4; YES), the CPU 11 displays contents of the specified view window data 134S on the display 3 (Step S5).

Next, the CPU 11 changes the contents of the specified view window data 134S on the basis of a user operation (Step S6).

Next, the CPU 11 determines whether or not an operation to complete the correction of the specified view window data 134S is performed (Step S7). When determining that the operation is not performed (Step S7; NO), the CPU 11 moves to Step S5.

On the other hand, when determining that the operation is performed (Step S7; YES), the CPU 11 determines whether or not its scientific calculator 1 is the scientific calculator 1A (Step S8).

When determining that its scientific calculator 1 is not the scientific calculator 1A but the scientific calculator 1B (Step S8; NO), the CPU 11 stores the corrected specified view window data 134S in the graph-related information storing table 133 so as to update the information in the graph-related information storing table 133 (Step S9), and then moves to Step S4. More specifically, at Step S9, the CPU 11 correlates the corrected specified view window data 134S with a region number "1" (the only one region number, namely, the only one specified region number, in the scientific calculator 1B), and stores the corrected specified view window data 134S in the graph-related information storing table 133.

On the other hand, when determining that its scientific calculator 1 is the scientific calculator 1A (Step S8; YES), the CPU 11 determines whether or not graph expression data 137 is (or are) stored under the specified region number in the graph-related information storing table 133 (Step S11).

When determining that no graph expression data 137 is stored under the specified region number (Step S11; NO), the CPU 11 stores the corrected specified view window data 134S in the graph-related information storing table 133 so as to update the information in the graph-related information storing table 133 (Step S12), and then moves to Step S4. More specifically, at Step S12, the CPU 11 correlates the corrected specified view window data 134S with the specified region number, and stores the corrected specified view window data 134S under the specified region number in the graph-related information storing table 133.

On the other hand, when determining that graph expression data 137 is stored under the specified region number (Step S11; YES), the CPU 11 determines whether or not an operation to correlate the corrected specified view window data 134S with another region number in the graph-related information storing table 133, and to store the corrected specified view window data 134S with the region number in the graph-related information storing table 133 (Step S13).

When determining that the operation is not performed (Step S13; NO), the CPU 11 moves to Step S12.

On the other hand, when determining that the operation is performed (Step S13; YES), the CPU 11 correlates the corrected specified view window data 134S with another region number in the graph-related information storing table 133, and stores the corrected specified view window data 134S under the region number in the graph-related information storing table 133 (Step S14), and then moves to Step S4.

At Step S4, when determining that the operation to correct the specified view window data 134S is not performed (Step S4; NO), the CPU 11 determines whether or not an operation to display graph expressions stored in the graph-related information storing table 133 in a list form (Step S21).

When determining that the operation is performed (Step S21; YES), the CPU 11 determines whether or not its scientific calculator 1 is the scientific calculator 1A (Step S22).

When determining that its scientific calculator 1 is not the scientific calculator 1A but the scientific calculator 1B (Step S22; NO), the CPU 11 reads graph expression data 137 respectively correlated with expression numbers from the graph expression data table 135 under the region number "1" (the only one region number, namely, the only one specified region number, in the scientific calculator 1B) in the graph-related information storing table 133, correlates graph expressions respectively shown by the graph expression data 137 with the expression numbers so as to display the graph expressions and the expression numbers on the display 3 in a list form (Step S23), and then moves to Step S26. At Step S23, if there is no graph expression data 137 correlated with an expression number, the CPU 11 displays only the expression number with a display area for a graph expression left in blank.

On the other hand, when determining that its scientific calculator 1 is the scientific calculator 1A (Step S22; YES), the CPU 11 displays the specified region number on the display 3 (Step S24).

Next, the CPU 11 reads graph expression data 137 respectively correlated with expression numbers and user names from the graph expression data table 135 under the specified region number in the graph-related information storing table 133, correlates graph expressions respectively shown by the graph expression data 137 with the expression numbers and the user names so as to display the graph expressions, the expression numbers, and the user names on the display 3 in a list form (Step S25). At Step S25, if there is no graph expression data 137 correlated with an expression number, the CPU 11 displays only the expression number with a display area for a graph expression left in blank.

Next, the CPU 11 specifies one expression number on the basis of a user operation, and inputs or corrects a graph expression correlated with the expression number (Step S26).

Next, the CPU 11 determines whether or not an operation to complete the input or correction of the graph expression is performed (Step S27). When determining that the operation is not performed (Step S27; NO), the CPU 11 moves to Step S26. On the other hand, when determining that the operation is performed (Step S27; YES), the CPU 11 moves to Step S4.

At Step S21, when determining that the operation to display graph expressions stored in the graph-related information storing table 133 in a list form is not performed (Step S21; NO), as shown in FIG. 4, the CPU 11 determines whether or not an operation to display a graph figure is performed (Step S31).

When determining that the operation is performed (Step S31; YES), the CPU 11 determines whether or not its scientific calculator 1 is the scientific calculator 1A (Step S32).

When determining that its scientific calculator 1 is not the scientific calculator 1A but the scientific calculator 1B (Step S32; NO), the CPU 11 reads graph expression data 137 from the graph expression data table 135 under a region number "1" (the only one region number, namely, the only one specified region number, in the scientific calculator 1B) in the graph-related information storing table 133, and displays a graph figure shown by the graph expression data 137 in such a way that the graph figure is superimposed on the background image of the specified image data 132S (Step S33). At this point, if there is a plurality of graph expression data 137 in the graph expression data table 135 under the region number "1", the CPU 11 displays graph figures respectively shown by the plurality of graph expression data 137 in different colors.

Next, the CPU 11 determines whether or not an operation to perform trace display of a graph figure is performed (Step S34).

When determining that the operation is not performed (Step S34; NO), the CPU 11 determines whether or not an operation to end display of a graph figure is performed (Step S35).

When determining that the operation is not performed (Step S35; NO), the CPU 11 moves to Step S32. On the other hand, when determining that the operation is performed (Step S35; YES), the CPU 11 moves to Step S4.

At Step S34, when determining that the operation to perform trace display of a graph figure is performed (Step S34; YES), the CPU 11 specifies a graph figure in the displayed graph figures on the basis of a user operation, and displays the graph expression for the specified graph figure on the display 3 in a color which is the same as the color of the specified graph figure (Step S41).

Next, the CPU 11 displays a trace pointer P (shown in FIG. 9C) on the specified graph figure, and displays coordinate values of the trace pointer P on the display 3 (Step S42).

Next, the CPU 11 determines whether or not a left key or a right key of the cursor key 22 is operated (Step S43). When determining that the left key or the right key of the cursor key 22 is operated (Step S43; YES), the CPU 11 moves the trace pointer P on the specified graph figure in a direction specified by the cursor key 22 (Step S44), and then moves to Step S42.

On the other hand, when determining that neither the left key nor the right key of the cursor key 22 is operated (Step S43; NO), the CPU 11 determines whether or not an up key or a down key of the cursor key 22 is operated (Step S45).

When determining that the up key or the down key of the cursor key 22 is operated (Step S45; YES), the CPU 11 changes the specified graph figure to another graph figure in a direction specified by the cursor key 22 (Step S46), and then moves to Step S41.

On the other hand, when determining that neither the up key nor the down key of the cursor key 22 is operated (Step S45; NO), the CPU 11 determines whether or not an operation to end trace display of a graph figure is performed (Step S47).

When determining that the operation is not performed (Step S47; NO), the CPU 11 moves to Step S42. On the other hand, when determining that the operation is performed (Step S47; YES), the CPU 11 moves to Step S35.

At Step S32, when determining that its scientific calculator 1 is the scientific calculator 1A (Step S32; YES), the CPU 11 determines whether or not an operation to specify a region number in the graph-related information storing table 133 is performed (Step S51).

When determining that the operation is performed (Step S51; YES), the CPU 11 displays the specified region number, which is specified on the basis of a user operation, on the display 3 (Step S52), and then moves to Step S54.

On the other hand, when determining that the operation is not performed (Step S51; NO), the CPU 11 displays the specified region number, which has been already specified by this point of time, on the display 3 (Step S53).

Next, the CPU 11 sets display range data of the XY coordinate system shown by the view window data 134 (specified view window data 134S) under the specified region number onto the image display region where the image of the specified image data 132S is displayed (Step S54). At this point, if its scientific calculator 1 is the scientific calculator 1A, the CPU 11 makes the scientific calculator 1B set, with respect to the XY coordinate system, the display range data of the XY coordinate system shown by the specified view window data 134S onto the image display region.

Next, the CPU 11 reads graph expression data 137 from the graph expression data table 135 under the specified region number in the graph-related information storing table 133, and displays a graph figure shown by the graph expression data 137 in such a way that the graph figure is superimposed on the background image of the specified image data 132S (step S55). At this point, if there is a plurality of graph expression data 137 in the graph expression data table 135 under the specified region number, the CPU 11 displays graph figures respectively shown by the plurality of graph expression data 137 in different colors.

Next, with respect to each of the graph figures, the CPU 11 displays a graph expression for the graph figure and a user name correlated with the graph expression data 137 of the graph expression in a color which is the same as the color of the graph figure so as to correlate the graph expression and the user name with the graph figure (Step S56).

Next, the CPU 11 determines whether or not an operation to perform trace display of a graph figure is performed (Step S61).

When determining that the operation is not performed (Step S61; NO), the CPU 11 moves to Step S35.

On the other hand, when determining that the operation is performed (Step S61; YES), the CPU 11 specifies one graph figure in the displayed graph figures on the basis of a user operation, displays the trace pointer P on the specified graph figure, and displays coordinate values of the trace pointer P on the display 3 (Step S63).

Next, the CPU 11 determines whether or not the left key or the right key of the cursor key 22 is operated (Step S64). When determining that the left key or the right key of the cursor key 22 is operated (Step S64; YES), the CPU 11 moves the trace pointer P on the specified graph figure in a direction specified by the cursor key 22 (Step S65), and then moves to Step S63.

On the other hand, when determining that neither the left key nor the right key of the cursor key 22 is operated (Step S64; NO), the CPU 11 determines whether or not the up key or the down key of the cursor key 22 is operated (Step S66).

When determining that the up key or the down key of the cursor key 22 is operated (Step S66; YES), the CPU 11 changes the specified graph figure to another graph figure in a direction specified by the cursor key 22 (Step S67), and then moves to Step S63.

On the other hand, when determining that neither the up key nor the down key of the cursor key 22 is operated (Step S66; NO), the CPU 11 determines whether or not an operation to end trace display of a graph figure is performed (Step S68).

When determining that the operation is not performed (Step S68; NO), the CPU 11 moves to Step S63. On the other hand, when determining that the operation is performed (Step S68; YES), the CPU 11 moves to Step S35.

Figure 5:
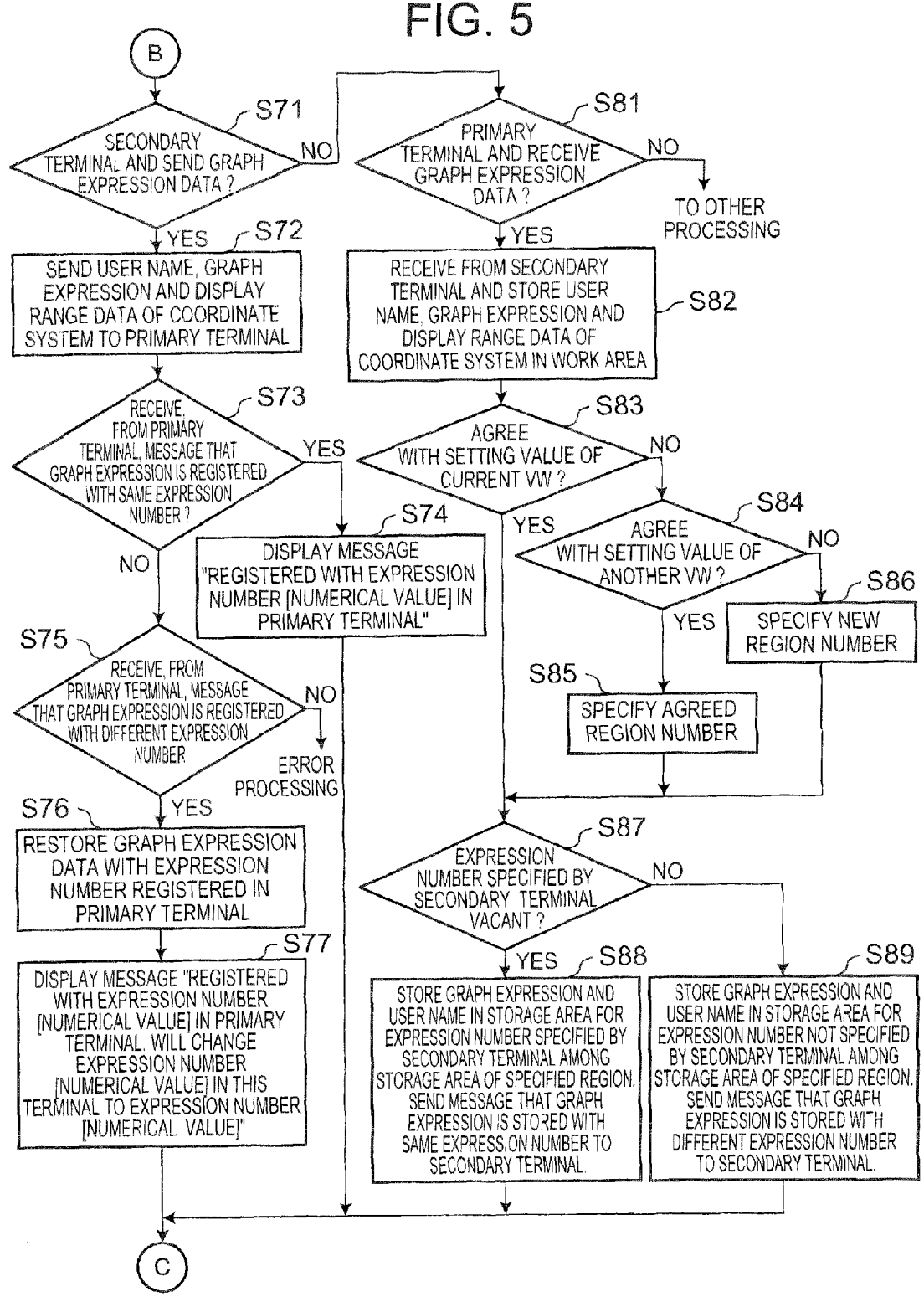
FIG. 5 is a third part of the flowchart of the image display processing.

At Step S31, when determining that the operation to display a graph figure is not performed (Step S31; NO), as shown in FIG. 5, the CPU 11 determines whether or not its scientific calculator 1 is the scientific calculator 1B, and also determines whether or not an operation to send graph expression data 137 is performed (Step S71).

When determining that its scientific calculator 1 is the scientific calculator 1B and the operation to send graph expression data 137 is performed (Step S71; YES), the CPU 11 sends the user name of its scientific calculator 1, graph expression data 137 in the graph expression data table 135 under the region number "1" (the only one region number, namely, the only one specified region number, in the scientific calculator 1B), the expression number, and the view window data 134 to the scientific calculator 1A from the communication unit 16 (Step S72).

Next, the CPU 11 determines whether or not a message that the graph expression data 137 is stored with an expression number which is the same as that in its scientific calculator 1 is received from the scientific calculator 1A (Step S73). (Refer to Step S88 below too.)

When determining that the message is received from the scientific calculator 1A (Step S73; YES), the CPU 11 displays the expression number on the display 3, and also displays on the display 3 a message that the graph expression data 137 is stored with the expression number in the scientific calculator 1A (Step S74), and then moves to Step S4.

On the other hand, when determining that the message is not received from the scientific calculator 1A (Step S73; NO), the CPU 11 determines whether or not a message that the graph expression data 137 is stored with an expression number which is different from that in its scientific calculator 1 is received from the scientific calculator 1A (Step S75).

When determining that the message is not received from the scientific calculator 1A (Step S75; NO), the CPU 11 performs error processing.

On the other hand, when determining that the message is received from the scientific calculator 1A (Step S75; YES), the CPU 11 detects the expression number correlated with the graph expression data 137 in the scientific calculator 1A, and makes the expression number a new expression number for the graph expression data 137 in the graph expression data table 135 of its scientific calculator 1 (Step S76).

Next, the CPU 11 displays the new expression number on the display 3, and also displays a message that the graph expression data 137 is stored with the expression number in the scientific calculator 1A and its scientific calculator 1 (Step S77), and then moves to Step S4.

At Step S71, when determining that its scientific calculator 1 is not the scientific calculator 1B, or determining that its scientific calculator 1 is the scientific calculator 1B but the operation to send graph expression data 137 is not performed (Step S71; NO), the CPU 11 determines whether or not its scientific calculator 1 is the scientific calculator 1A, and also determines whether or not its scientific calculator 1 receives graph expression data 137 (Step S81).

When determining that its scientific calculator 1 is not the scientific calculator 1A, or determining that its scientific calculator 1 is the scientific calculator 1A but does not receive graph expression data 137 (Step S81; NO), the CPU 11 moves to other processing.

On the other hand, when determining that its scientific calculator 1 is the scientific calculator 1A and receives graph expression data 137 (Step S81; YES), the CPU 11 receives the user name of the scientific calculator 1 (the scientific calculator 1B) from which the graph expression data 137 is sent, the graph expression data 137, the expression number, and the view window data 134 via the communication unit 16 (Step S82).

Next, the CPU 11 determines whether or not contents of the view window data 134 (not-own view window data 134T, hereinbelow) received from the scientific calculator 1 (a not-own scientific calculator 1, hereinbelow), agree with contents of the specified view window data 134S at this point (Step S83).

When determining that the contents of the not-own view window data 134T do not agree with the contents of the specified view window data 134S at this point (Step S83; NO), the CPU 11 determines whether or not the contents of the not-own view window data 134T agree with contents of any view window data 134 in the graph-related information storing table 133 of its scientific calculator 1 (Step S84).

When determining that the contents of the not-own view window data 134T agree with the contents of one view window data 134 in the graph-related information storing table 133 of its scientific calculator 1 (Step S84; YES), the CPU 11 sets the region number correlated with the view window data 134, the contents of which agree with the contents of the not-own view window data 134T, as a specified region number (Step S85), and then moves to Step S87.

On the other hand, when determining that the contents of the not-own view window data 134T do not agree with the contents of any view window data 134 in the graph-related information storing table 133 of its scientific calculator 1 (Step S84; NO), the CPU 11 sets one unused region number in the graph-related information storing table 133 as a specified region number (Step S86), and then moves to Step S87.

At Step S83, when determining that the contents of the not-own view window data 134T agree with the contents of the specified view window data 134S at this point (Step S83; YES), the CPU 11 refers to the graph expression data table 135 under the specified region number in the graph-related information storing table 133, and determines whether or not a storage area, where graph expression data 137 is stored, for the expression number received from the not-own scientific calculator 1 is vacant (Step S87).

When determining that the storage area for the expression number received from the not-own scientific calculator 1 is vacant (Step S87; YES), the CPU 11 correlates the received graph expression data 137 with the received user name, and stores the correlated graph expression data 137 and user name in the storage area (the storage area for the expression number in the graph expression data table 135 under the specified region number), and sends a message that the graph expression data 137 is stored with an expression number which is the same as that in the scientific calculator 1B to the not-own scientific calculator 1 from which the graph expression data 137 is sent at Step S82 (Step S88), and then moves to Step S4.

On the other hand, when determining that the storage area for the expression number received from the not-own scientific calculator 1 is not vacant (Step S87; NO), the CPU 11 detects an expression number correlated with an unused storage area among the expression numbers in the graph expression data table 135 under the specified region number, correlates the received graph expression data 137 with the received user name, stores the correlated graph expression data 137 and user name in the storage area, and sends a message that the graph expression data 137 is stored with an expression number which is different from that in the scientific calculator 1B to the not-own scientific calculator 1 from which the graph expression data 137 is sent at Step S82 (Step S89), and then moves to Step S4.

[3. Operation Example]

Next, referring to the drawings, the above operation is described to be more specific.

Figure 6A:
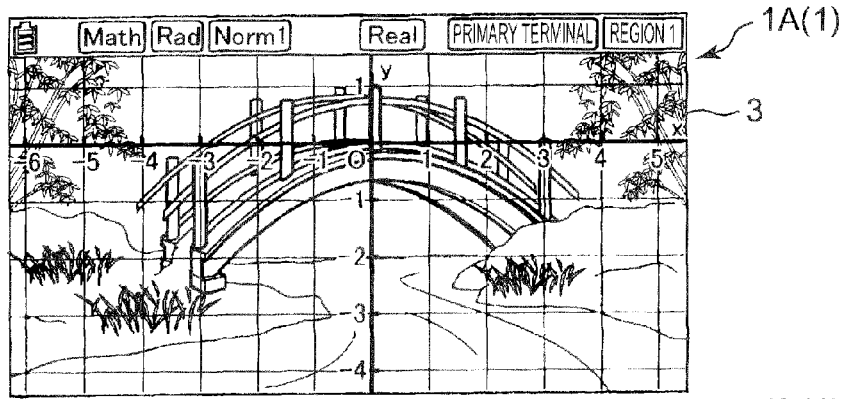
FIG. 6A shows display contents displayed on a display.
Figure 6B:
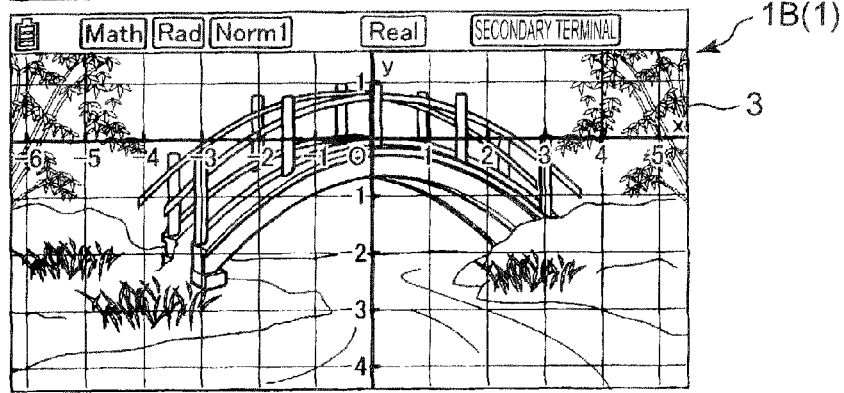
FIG. 6B shows display contents displayed on the display.

First, when a first user (teacher) performs the setting operation to display a graph figure with a background image in the teacher's scientific calculator 1A as a primary terminal (Step S1; YES), and specifies one image data 132 in the image folder 131 as specified image data 132S, one region number in the graph-related information storing table 133 as a specified region number, and view window data 134 under the specified region number as specified view window data 134S (Step S2), as shown in FIG. 6A, the background image of the specified image data 132S is displayed on the display 3, and with respect to the XY coordinate system, display range data of the XY coordinate system shown by the specified view window data 134S is set onto the image display region (Step S3). At this point, as shown in FIG. 6B, on the display 3 of each scientific calculator 1B as a secondary terminal too, the background image of the specified image data 132S is displayed, and with respect to the XY coordinate system, the display range data of the XY coordinate system shown by the specified view window data 134S is set onto the image display region.

Next, when a second user (student: Ken) performs the operation to display graph expressions stored in the graph-related information storing table 133 in a list form in Ken's scientific calculator 1B as a secondary terminal (Step S21; YES and Step S22; NO), graph expression data 137 correlated with expression numbers are read from the graph expression data table 135 under a region number "1" in the graph-related information storing table 133, and graph expressions respectively shown by the graph expression data 137 are correlated with the expression numbers, and displayed on the display 3 of Ken's scientific calculator 1B in a list form (Step S23).

Figure 6C:
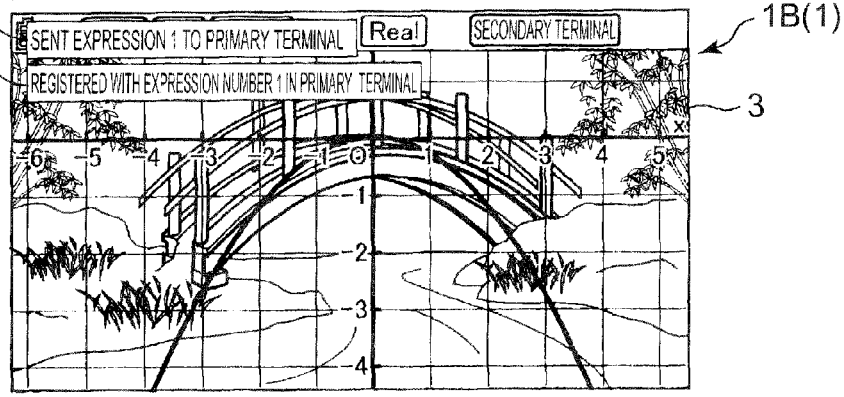
FIG. 6C shows display contents displayed on the display.

Next, when the second user (student: Ken) specifies an expression number "1", and inputs a graph expression "Y1=–0.3x$^2$" correlated with the expression number, (Step S26 and Step S27; YES), and performs the operation to display a graph figure (Step S31; YES and Step S32; NO), as shown in FIG. 6C, in Ken's scientific calculator 1B, graph expression data 137 is read from the graph expression data table 135 under the region number "1" in the graph-related information storing table 133, and a graph figure shown by the graph expression data 137 is displayed on the background image of the specified image data 132S (Step S33). In this operation example, at this point, in Ken's scientific calculator 1B, only the graph expression data 137 of the graph expression "Y1=–0.3x$^2$" is stored in the graph expression data table 135. Note that, in this operation example, the index "1" next to the "Y" in the "Y1=–0.3x$^2$" indicates the expression number for the graph expression.

When the second user (student: Ken) performs the operation to send graph expression data 137 in Ken's scientific calculator 1B (Step S71; YES), the user name for the scientific calculator 1B, "Ken", the graph expression data 137 "Y1=–0.3x$^2$" in the graph expression data table 135 under the region number "1", the expression number "1", and the view window data 134 are sent to the scientific calculator 1A, and as shown in FIG. 6C, a message M1 that the graph expression data 137 correlated with the expression number "1" (graph expression 1: Y1=–0.3x$^2$) is sent to the scientific calculator 1A is displayed (Step S72).

Figure 6D:
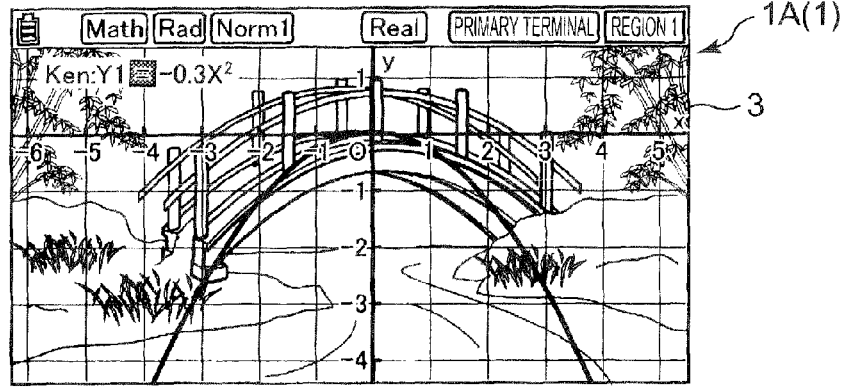
FIG. 6D shows display contents displayed on the display.

On the other hand, in the scientific calculator 1A, it is determined that the scientific calculator 1A receives the graph expression data 137 (Step S81; YES), and accordingly the scientific calculator 1A receives the user name for the scientific calculator 1B from which the graph expression data 137 is sent, "Ken", the graph expression data 137 "Y1=–0.3x$^2$", the expression number "1", and the view window data 134 (Step S82). Next, it is determined that the contents of the not-own view window data 134T received from Ken's scientific calculator 1B agree with the contents of the specified view window data 134S at this point (Step S83; YES), and then it is determined that a storage area, where graph expression data 137 is stored, for the expression number "1" received from Ken's scientific calculator 1B is vacant (Step S87; YES), the received graph expression data 137 "Y1=–0.3x$^2$" and the received user name "Ken" are correlated with each other and stored in the storage area for the expression number "1" in the graph expression data table 135 under the specified region number "1", and a message that the graph expression data 137 is stored with the expression number "1", which is the same as that in Ken's scientific calculator 1B, is sent to Ken's scientific calculator 1B (Step S88). In this operation example, at this point, in the scientific calculator 1A, a message that the "Y1=–0.3x$^2$" is received from "Ken" is displayed on the display 3 for a predetermined period of time, and after that, as shown in FIG. 6D, the received user name "Ken", the graph expression "Y1=–0.3x$^2$", and a graph figure shown by the graph expression "Y1=–0.3x$^2$" are displayed on the display 3.

Next, in Ken's scientific calculator 1B, a message that the graph expression data 137 "Y1=–0.3x$^2$" is stored with the expression number "1", which is the same as that in Ken's scientific calculator 1B, is received from the scientific calculator 1A (Step S73; YES), and as shown in FIG. 6C, a message M2 that the graph expression data 137 is stored with the expression number "1" in the scientific calculator 1A is displayed (Step S74).

Next, when a third user (student: John) performs the operation to display graph expressions stored in the graph-related information storing table 133 in a list form in John's scientific calculator 1B as a secondary terminal (Step S21; YES and Step S22; NO), graph expression data 137 correlated with expression numbers are read from the graph expression data table 135 under a region number "1" in the graph-related information storing table 133, and graph expressions respectively shown by the graph expression data 137 are correlated with the expression numbers, and displayed on the display 3 of John's scientific calculator 1B in a list form (Step S23).

Figure 7A:
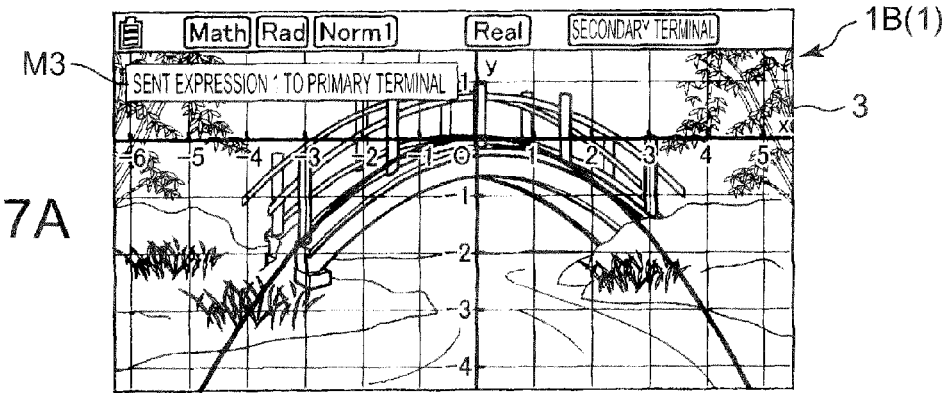
FIG. 7A shows display contents displayed on the display.

Next, when the third user (student: John) specifies an expression number "1", and inputs a graph expression "Y1=–0.2x$^2$" correlated with the expression number (Step S26 and Step S27; YES), and performs the operation to display a graph figure (Step S31; YES and Step S32; NO), as shown in FIG. 7A, in John's scientific calculator 1B, graph expression data 137 is read from the graph expression data table 135 under the region number "1" in the graph-related information storing table 133, and a graph figure shown by the graph expression data 137 is displayed on the background image of the specified image data 132S (Step S33). In this operation example, at this point, in John's scientific calculator 1B, only the graph expression data 137 of the graph expression "Y1=–0.2x$^2$" is stored in the graph expression data table 135.

When the third user (student: John) performs the operation to send graph expression data 137 in John's scientific calculator 1B (Step S71; YES), the user name for the scientific calculator 1B, "John", the graph expression data 137 "Y1=–0.2x$^2$" in the graph expression data table 135 under the region number "1", the expression number "1", and the view window data 134 are sent to the scientific calculator 1A, and as shown in FIG. 7A, a message M3 that the graph expression data 137 correlated with the expression number "1" (graph expression 1: Y1=−0.2x$^2$) is sent to the scientific calculator 1A is displayed (Step S72).

Figure 7B:
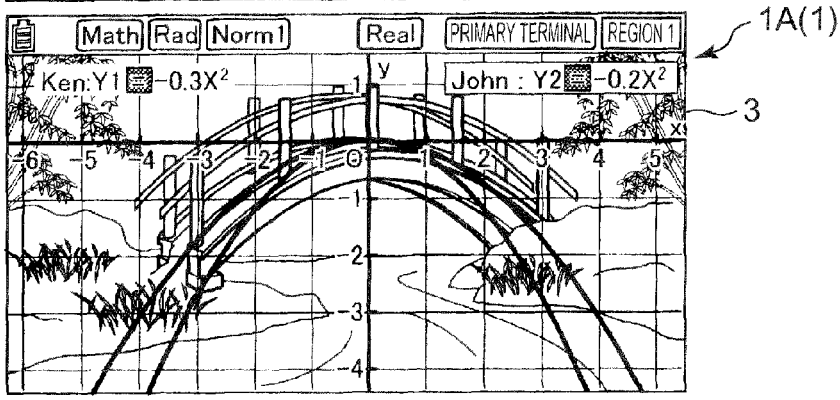
FIG. 7B shows display contents displayed on the display.

On the other hand, in the scientific calculator 1A, it is determined that the scientific calculator 1A receives the graph expression data 137 (Step S81; YES), and accordingly the scientific calculator 1A receives the user name for the scientific calculator 1B from which the graph expression data 137 is sent, "John", the graph expression data 137 "Y1=−0.2x$^2$", the expression number "1", and the view window data 134 (Step S82). Next, it is determined that the contents of the not-own view window data 134T received from John's scientific calculator 1B agree with the contents of the specified view window data 134S at this point (Step S83; YES), and then it is determined that a storage area, where graph expression data 137 is stored, for the expression number "1" received from John's scientific calculator 1B is not vacant (Step S87; NO), among the expression numbers in the graph expression data table 135 under the specified region number "1", an expression number "2" correlated with an unused storage area is detected, the received graph expression data 137 "Y1=−0.2x$^2$" and the received user name "John" correlated with each other are stored in the storage area for the expression number "2", and a message that the graph expression data 137 is stored with the expression number "2", which is different from that in John's scientific calculator 1B, is sent to John's scientific calculator 1B (Step S89). In this operation example, at this point, in the scientific calculator 1A, a message that the "Y1=−0.2x$^2$" is received from "John" and the graph expression is stored with the expression number "2" is displayed on the display 3 for a predetermined period of time, and after that, as shown in FIG. 7B, the received user name "John", the graph expression "Y2=−0.2x$^2$", and a graph figure shown by the graph expression "Y2=−0.2x$^2$" are additionally displayed on the display 3.

Figure 7C:
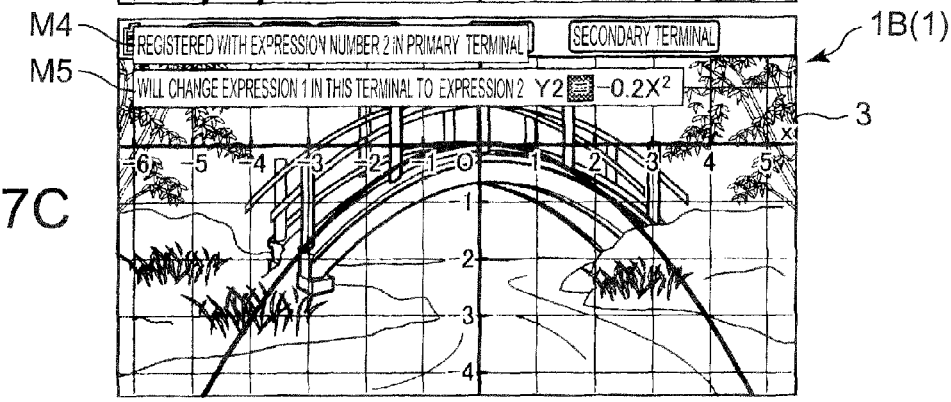
FIG. 7C shows display contents displayed on the display.

Next, in John's scientific calculator 1B, a message that the graph expression data 137 "Y1=−0.2x$^2$" is stored with the expression number "2", which is different from that in John's scientific calculator 1B, is received from the scientific calculator 1A (Step S75; YES), and then the expression number "2" correlated with the graph expression data 137 in the scientific calculator 1A is detected, and the expression number "2" is made to be a new expression number for the graph expression data 137 "Y1=−0.2x$^2$" in the graph expression data table 135 of John's scientific calculator 1B (Step S76). Then, as shown in FIG. 7C, a message M4 that the graph expression data 137 is stored with the new expression number "2" in the scientific calculator 1A and a message M5 that the expression number for the graph expression data 137 is changed from "1" to "2" in John's scientific calculator 1B are displayed (Step S77).

Figure 7D:
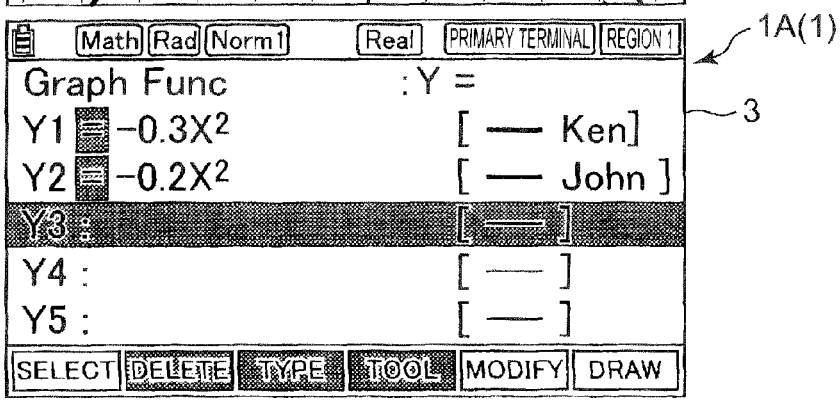
FIG. 7D shows display contents displayed on the display.

When the first user (teacher) performs the operation to display graph expressions stored in the graph-related information storing table 133 in a list form in the scientific calculator 1A (Step S21; YES and Step S22; NO), as shown in FIG. 7D, the specified region number "1" is displayed on the display 3 (Step S24), and graph expression data 137 and user names correlated with expression numbers are read from the graph expression data table 135 under the specified region number "1" in the graph-related information storing table 133, and graph expressions respectively shown by the graph expression data 137 are correlated with the expression numbers and the user names, and displayed on the display 3 in a list form (Step S25).

Next, when the first user (teacher) performs the operation to correct the specified view window data 134S (Step S4; YES), and changes the contents of the specified view window data 134S (Step S6), it is determined that the graph expression data 137 "Y1=−0.3x$^2$" and "Y1=−0.2x$^2$" are stored under the specified region number "1" in the graph-related information storing table 133 (Step S11; YES). Then, when the first user (teacher) performs the operation to correlate the corrected specified view window data 134S with another region number "2", and to store the corrected specified view window data 134S with the region number "2" (Step S13; YES), the corrected specified view window data 134S is correlated with the region number "2", and stored under the region number "2" in the graph-related information storing table 133 (Step S14).

Figure 8A:
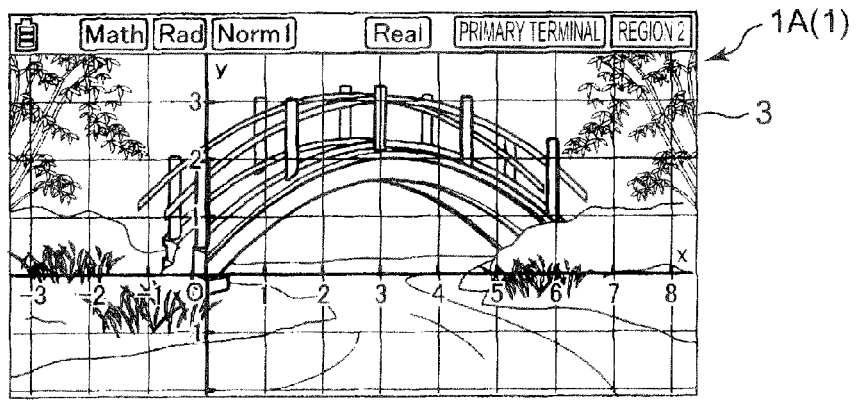
FIG. 8A shows display contents displayed on the display.

In this operation example, at this point, in the scientific calculator 1A, as shown in FIG. 8A, the background image of the specified image data 132S is displayed on the display 3, and with respect to the XY coordinate system, display range data of the XY coordinate system shown by the corrected specified view window data 134S is set onto the image display region.

Figure 8B:
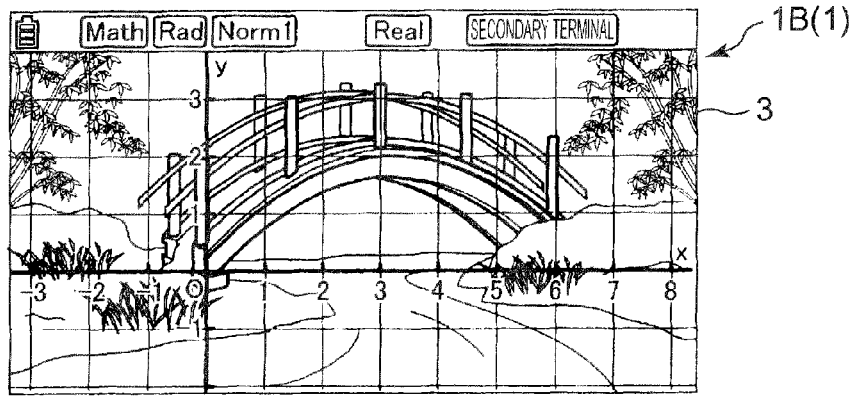
FIG. 8B shows display contents displayed on the display.

In addition, at this point, in each scientific calculator 1B, the corrected specified view window data 134S is correlated with the region number "1", and stored under the region number "1" in the graph-related information storing table 133, and as shown in FIG. 8B, the background image of the specified image data 132S is displayed on the display 3, and with respect to the XY coordinate system, the display range data of the XY coordinate system shown by the corrected specified view window data 134S is set onto the image display region.

When the third user (student: John) performs the operation to display graph expressions stored in the graph-related information storing table 133 in a list form in John's scientific calculator 1B as a secondary terminal (Step S21; YES and Step S22; NO), graph expression data 137 correlated with expression numbers are read from the graph expression data table 135 under the region number "1" in the graph-related information storing table 133, and graph expressions respectively shown by the graph expression data 137 are correlated with the expression numbers, and displayed on the display 3 of John's scientific calculator 1B in a list form (Step S23).

Figure 8C:
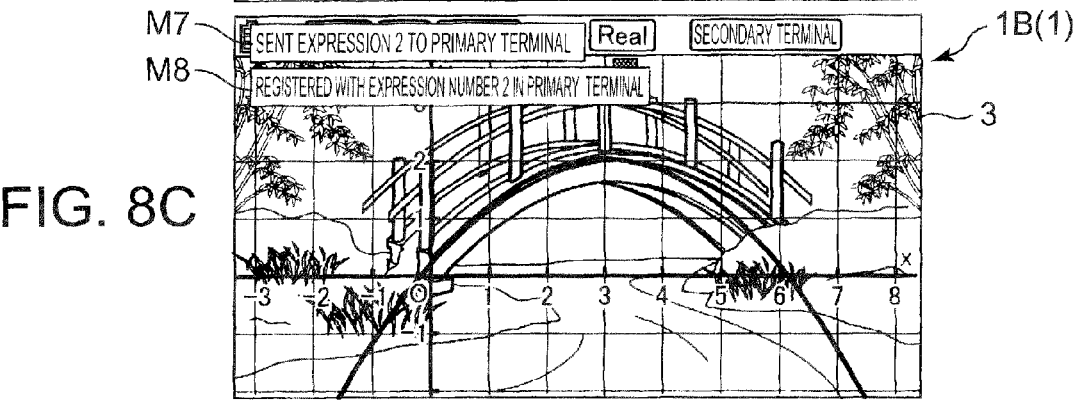
FIG. 8C shows display contents displayed on the display.

Next, when the third user (student: John) specifies an expression number "2", and inputs a graph expression "Y2=−0.2(x−3)$^2$+2" correlated with the expression number (Step S26 and Step S27; YES), and performs the operation to display a graph figure (Step S31; YES and Step S32; NO), as shown in FIG. 8C, in John's scientific calculator 1B, graph expression data 137 is read from the graph expression data table 135 under the region number "1" in the graph-related information storing table 133, and a graph figure shown by the graph expression data 137 is displayed on the background image of the specified image data 132S (Step S33). In this operation example, at this point, in John's scientific calculator 1B, only the graph expression data 137 of the graph expression "Y2=−0.2(x−3)$^2$+2" is stored in the graph expression data table 135.

When the third user (student: John) performs the operation to send graph expression data 137 in John's scientific calculator 1B (Step S71; YES), the user name for the scientific calculator 1B, "John", the graph expression data 137 "Y2=−0.2(x−3)$^2$+2" in the graph expression data table 135 under the region number "1", the expression number "2", and the view window data 134 are sent to the scientific calculator 1A, and as shown in FIG. 8C, a message M7 that the graph expression data 137 correlated with the expression number "2" (graph expression 2: "Y2=−0.2(x−3)$^2$+2") is sent to the scientific calculator 1A is displayed (Step S72).

Figure 8D:
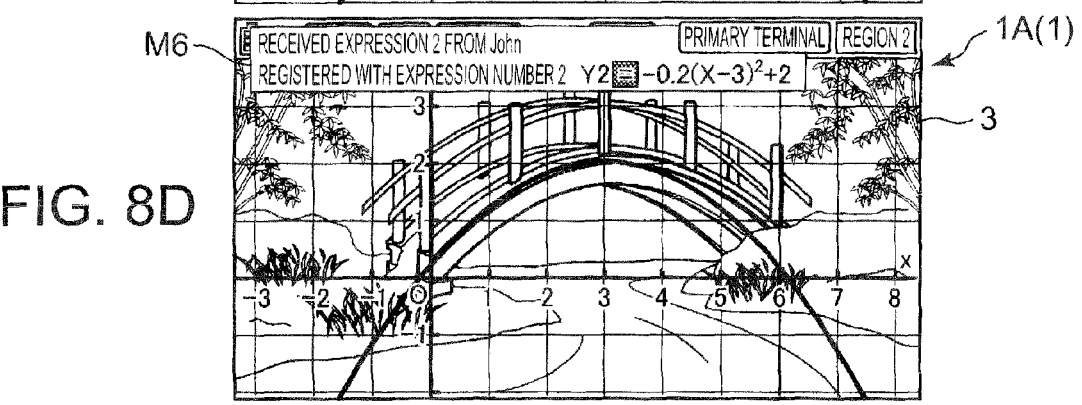
FIG. 8D shows display contents displayed on the display.

On the other hand, in the scientific calculator 1A, it is determined that the scientific calculator 1A receives the graph expression data 137 (Step S81; YES), and accordingly the scientific calculator 1A receives the user name for the scientific calculator 1B from which the graph expression data 137 is sent, "John", the graph expression data 137 "Y2=−0.2(x−3)$^2$+2", the expression number "2", and the view window data 134 (Step S82). Next, it is determined that the contents of the not-own view window data 134T received from John's scientific calculator 1B agree with the contents of the specified view window data 134S at this point (Step S83; YES), and then it is determined that a storage area, where graph expression data 137 is stored, for the expression number "2" received from John's scientific calculator 1B is vacant (Step S87; YES), the received graph expression data 137 "Y2=−0.2(x−3)$^2$+2" and the received user name "John" are correlated with each other, and stored in the storage area for the expression number "2" in the graph expression data table 135 under the specified region number "2", and a message that the graph expression data 137 is stored with the expression number "2", which is the same as that in John's calculator 1B, is sent to John's scientific calculator 1B (Step S88). In this operation example, in the scientific calculator 1A, as shown in FIG. 8D, a message M6 that the graph expression data 137 correlated with the expression number "2" (graph expression 2: Y2=−0.2(x−3)$^2$+2) is received from "John", and the graph expression data 137 is stored with the expression number "2" is displayed on the display 3 for a predetermined period of time, and after that, the received user name "John", the graph expression "Y2=−0.2(x−3)$^2$+2" and a graph figure shown by the graph expression "Y2=−0.2(x−3)$^2$+2" are displayed on the display 3.

In John's scientific calculator 1B, a message that the graph expression data 137 "Y2=−0.2(x−3)$^2$+2" is stored with the expression number "2", which is the same as that in John's scientific calculator 1B, is received from the scientific calculator 1A (Step S73; YES), and as shown in FIG. 8C, a message M8 that the graph expression data 137 is stored with the expression number "2" in the scientific calculator 1A is displayed (Step S74).

When the second user (student: Ken) performs the operation to display graph expressions stored in the graph-related information storing table 133 in a list form in Ken's scientific calculator 1B as a secondary terminal (Step S21; YES and Step S22; NO), graph expression data 137 correlated with expression numbers are read from the graph expression data table 135 under the region number "1" in the graph-related information storing table 133, and graph expressions respectively shown by the graph expression data 137 are correlated with the expression numbers, and displayed on the display 3 of Ken's scientific calculator 1B in a list form (Step S23).

Figure 9A:
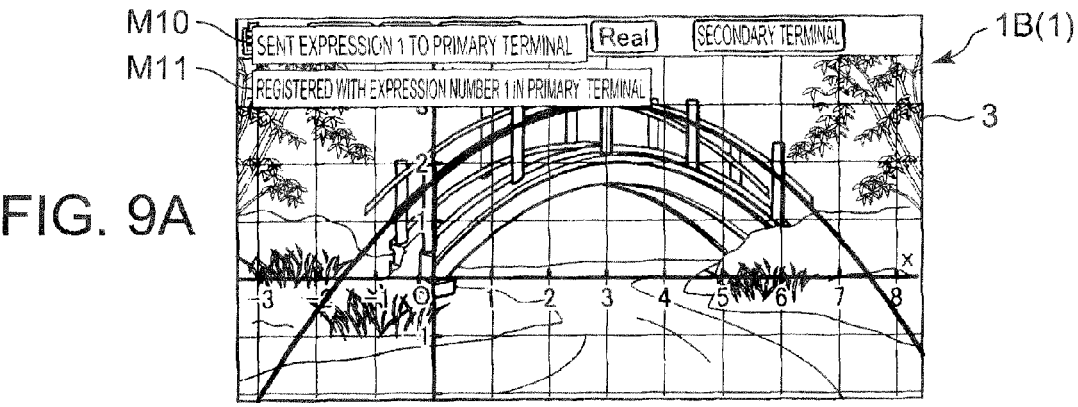
FIG. 9A shows display contents displayed on the display.

Next, when the second user (student: Ken) specifies an expression number "1", and inputs a graph expression "Y1=−0.15(x−3)$^2$+3" correlated with the expression number (Step S26 and Step S27; YES), and performs the operation to display a graph figure (Step S31; YES and Step S32; NO), as shown in FIG. 9A, in Ken's scientific calculator 1B, graph expression data 137 is read from the graph expression data table 135 under the region number "1" in the graph-related information storing table 133, and a graph figure shown by the graph expression data 137 is displayed on the background image of the specified image data 132S (Step S33). In this operation example, at this point, in Ken's scientific calculator 1B, only the graph expression data 137 of the graph expression "Y1=−0.15(x−3)$^2$+3" is stored in the graph expression data table 135.

When the second user (student: Ken) performs the operation to send graph expression data 137 in Ken's scientific calculator 1B (Step S71; YES), the user name for the scientific calculator 1B, "Ken", the graph expression data 137 "Y1=−0.15(x−3)$^2$+3" in the graph expression data table 135 under the region number "1", the expression number "1", and the view window data 134 are sent to the scientific calculator 1A, and as shown in FIG. 9A, a message M10 that the graph expression data 137 correlated with the expression number "1" (graph expression 1: Y1=−0.15(x−3)$^2$+3) is sent to the scientific calculator 1A is displayed (Step S72).

Figure 9B:
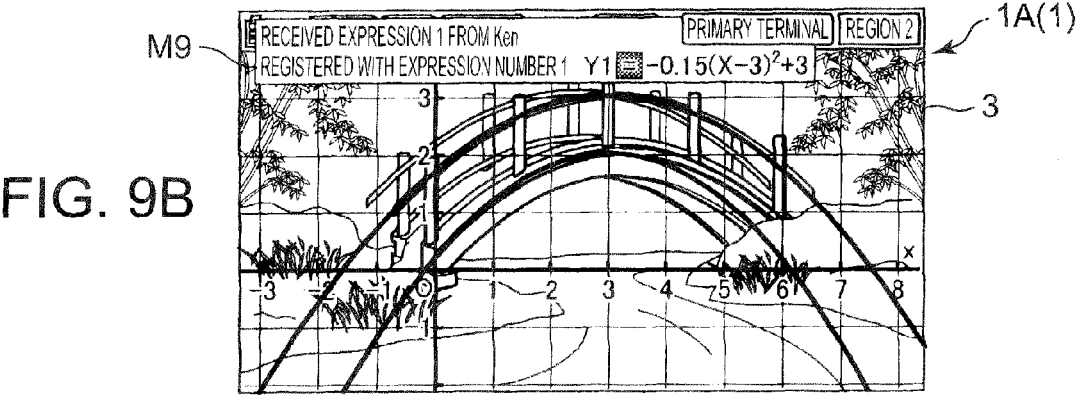
FIG. 9B shows display contents displayed on the display.

On the other hand, in the scientific calculator 1A, it is determined that the scientific calculator 1A receives the graph expression data 137 (Step S81; YES), and accordingly the scientific calculator 1A receives the user name for the scientific calculator 1B from which the graph expression data 137 is sent, "Ken", the graph expression data 137 "Y1=−0.15(x−3)$^2$+3", the expression number "1", and the view window data 134 (Step S82). Next, it is determined that the contents of the not-own view window data 134T received from Ken's scientific calculator 1B agree with the contents of the specified view window data 134S at this point (Step S83; YES), and then it is determined that a storage area, where graph expression data 137 is stored, for the expression number "1" received from Ken's scientific calculator 1B is vacant (Step S87; YES), and the received graph expression data 137 "Y1=−0.15(x−3)$^2$+3" and the received user name "Ken" are correlated with each other, and stored in the storage area for the expression number "1" in the graph expression data table 135 under the specified region number "2", and a message that the graph expression data 137 is stored with the expression number "1", which is the same as that in Ken's scientific calculator 1B, is sent to Ken's scientific calculator 1B (Step S88). In this operation example, at this point, in the scientific calculator 1A, as shown in FIG. 9B, a message M9 that the graph expression data 137 correlated with the expression number "1" (graph expression 1: Y1=−0.15(x−3)$^2$+3) is received from "Ken", and the graph expression data 137 is stored with the expression number "1" is displayed on the display 3 for a predetermined period of time, and after that, the received user name "Ken", the graph expression "Y1=−0.15(x−3)$^2$+3", and a graph figure shown by the graph expression "Y1=−0.15(x−3)$^2$+3" are additionally displayed on the display 3.

In Ken's scientific calculator 1B, a message that the graph expression data 137 "Y1=−0.15(x−3)$^2$+3" is stored with the expression number "1", which is the same as that in Ken's scientific calculator 1B, is received from the scientific calculator 1A (Step S73; YES), and as shown in FIG. 9A, a message M11 that the graph expression data 137 is stored with the expression number "1" in the scientific calculator 1A is displayed (Step S74).

Figure 9C:
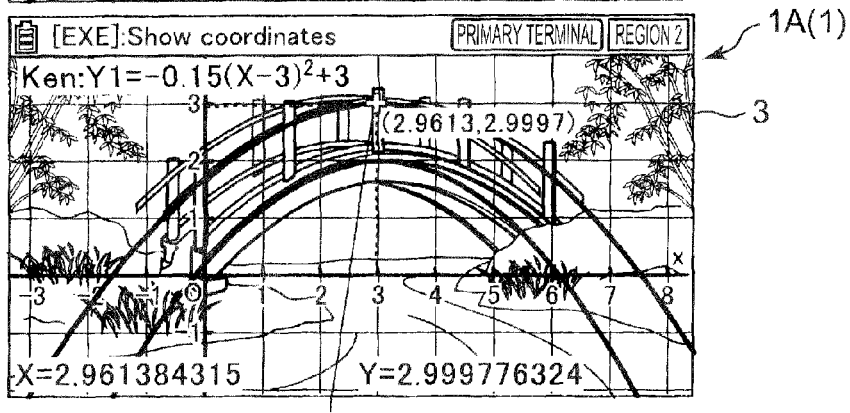
FIG. 9C shows display contents displayed on the display.

When the first user (teacher) performs the operation to display a graph figure in the scientific calculator 1A (Step S31; YES and Step S32; YES), and does not perform the operation to specify a region number in the graph-related information storing table 133 (Step S51; NO), as shown in FIG. 9C, the specified region number "2" which has been already specified by this point of time is displayed on the display 3 (Step S53). In addition, display range data of the XY coordinate system shown by the view window data 134 under the specified region number "2" is set onto the image display region where the background image of the specified image data 132S is displayed (Step S54). At this point, in each scientific calculator 1B too, the display range data of the XY coordinate system shown by the view window data 134 under the specified region number "2" of the scientific calculator 1A is set onto the image display region where the background image of the specified image data 132S is displayed.

Next, the graph expression data 137 "Y1=−0.15(x−3)²+3" and "Y2=−0.2(x−3)²+2" are read from the graph expression data table 135 under the specified region number "2" in the graph-related information storing table 133, and graph figures respectively shown by the graph expression data 137 are displayed on the background image of the specified image data 132S in different colors (Step S55). In addition, graph expressions for the graph figures and the user names correlated with the graph expression data 137 of the graph expressions are displayed in the colors which are respectively the same as the colors of the graph figures so that the graph expressions and the user names are correlated with the graph figures (Step S56)

Next, when the first user (teacher) performs the operation to perform trace display of a graph figure (Step S61; YES), and specifies the graph figure shown by the graph expression "Y1=−0.15(x−3)²+3", the trace pointer P is displayed on the specified graph figure, and coordinate values of the trace pointer P are displayed on the display 3 (Step S63).

Figure 10A:
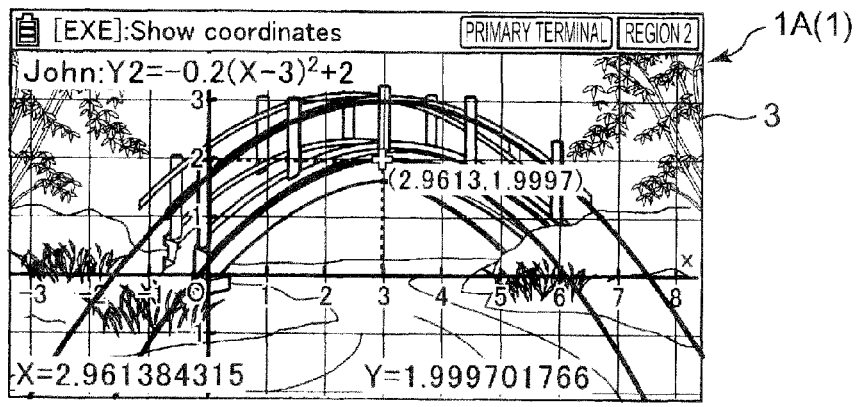
FIG. 10A shows display contents displayed on the display.

When the first user (teacher) operates the up key or the down key of the cursor key 22 (Step S66; YES), as shown in FIG. 10A, the specified graph figure is changed to another graph figure in a direction specified with the cursor key 22 (Step S67), the trace pointer P is displayed on the newly specified graph figure (graph expression: Y2=−0.2(x−3)²+2), and coordinate values of the trace pointer P are displayed on the display 3 (Step S63).

When a fourth user (student: Bob) performs the operation to correct the specified view window data 134S in Bob's scientific calculator 1B as a secondary terminal (Step S4; YES), the contents of the specified view window data 134S are displayed on the display 3 (Step S5).

Next, when the fourth user (student: Bob) changes the contents of the specified view window data 134S in Bob's scientific calculator 1B (Step S6 and Step S8; NO), the corrected specified view window data 134S is stored in the graph-related information storing table 133 so that the information in the graph-related information storing table 133 is updated (Step S9).

When the fourth user (student: Bob) performs the operation to display graph expressions stored in the graph-related information storing table 133 in a list form in Bob's scientific calculator 1B (Step S21; YES and Step S22; NO), graph expression data 137 correlated with expression numbers are read from the graph expression data table 135 under a region number "1" (the only one region number, namely, the only one specified region number, in the scientific calculator 1B) in the graph-related information storing table 133, and graph expressions respectively shown by the graph expression data 137 are correlated with the expression numbers, and displayed on the display 3 of Bob's scientific calculator 1B in a list form (Step S23).

Figure 10B:
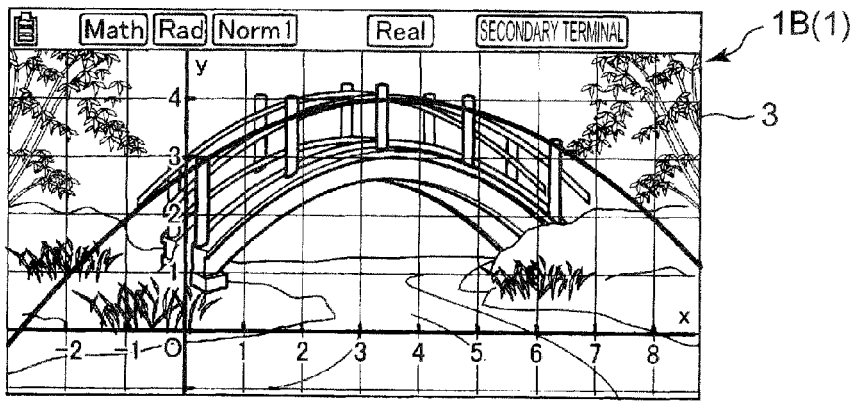
FIG. 10B shows display contents displayed on the display.

Next, when the fourth user (student: Bob) specifies an expression number "1", and inputs a graph expression "Y1=−0.1(x−3.5)²+4" correlated with the expression number (Step S26 and Step S27; YES), and performs the operation to display a graph figure (Step S31; YES and Step S32; NO), as shown in FIG. 10B, in Bob's scientific calculator 1B, graph expression data 137 is read from the graph expression data table 135 under the region number "1" in the graph-related information storing table 133, and a graph figure shown by the graph expression data 137 is displayed on the background image of the specified image data 132S (Step S33). In this operation example, at this point, in Bob's scientific calculator 1B, only the graph expression data 137 of the graph expression "Y1=−0.1(x−3.5)²+4" is stored in the graph expression data table 135.

When the fourth user (student: Bob) performs the operation to send graph expression data 137 in Bob's scientific calculator 1B (Step S71; YES), the user name for the scientific calculator 1B, "Bob", the graph expression data 137 "Y1=−0.1(x−3.5)²+4" in the graph expression data table 135 under the region number "1", the expression number "1", and the view window data 134 are sent to the scientific calculator 1A (Step S72).

Figure 10C:
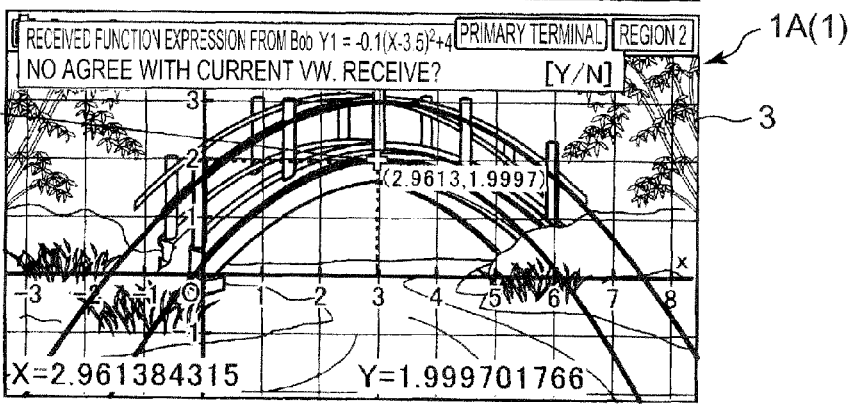
FIG. 10C shows display contents displayed on the display.

On the other hand, in the scientific calculator 1A, it is determined that the scientific calculator 1A receives the graph expression data 137 (Step S81; YES), and accordingly the scientific calculator 1A receives the user name for the scientific calculator 1B from which the graph expression data 137 is sent, "Bob", the graph expression data 137 "Y1=−0.1(x−3.5)²+4", the expression number "1", and the view window data 134 (Step S82). Next, it is determined that the contents of the not-own view window data 134T received from Bob's scientific calculator 1B do not agree with the contents of the specified view window data 134S at this point (Step S83; NO). In this operation example, as shown in FIG. 10C, on the display 3 of the scientific calculator 1A, a message that the contents of the not-own view window data 134T received from Bob's scientific calculator 1B do not agree with the contents of the specified view window data 134S at this point, and a message to ask whether or not to capture the not-own view window data 134T are displayed.

Figure 10D:
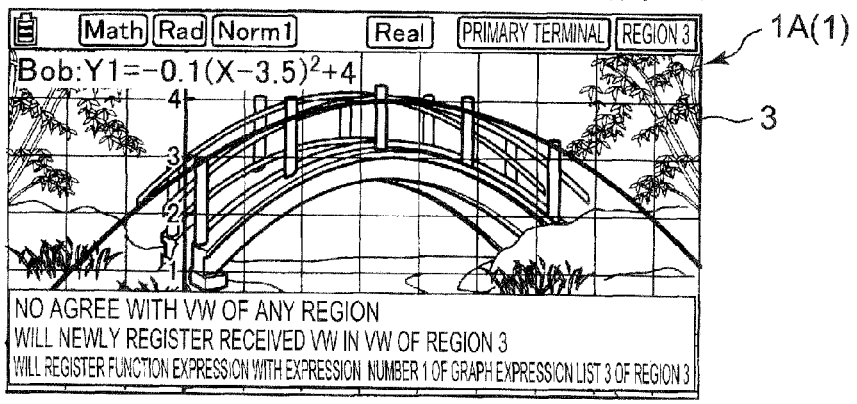
FIG. 10D shows display contents displayed on the display.

When the first user (teacher) performs the operation to capture the not-own view window data 134T, it is determined that the contents of the not-own view window data 134T do not agree with the contents of any view window data 134 in the graph-related information storing table 133 of the teacher's scientific calculator 1A (Step S84; NO). In this operation example, as shown in FIG. 10D, at this point, on the display 3 of the scientific calculator 1A, a message that the contents of the not-own view window data 134T do not agree with the contents of any view window data 134 in the graph-related information storing table 133 of the scientific calculator 1A is displayed.

After an unused region number "3" in the graph-related information storing table 133 is set as a specified region number (Step S86), it is determined that a storage area, where graph expression data 137 is stored, for the expression number "1" received from Bob's scientific calculator 1B is vacant (Step S87; YES), and the received graph expression data 137 "Y1=−0.1(x−3.5)²+4" and the received user name are correlated with each other, and stored in the storage area for the expression number "1" in the graph expression data table 135 under the specified region number "3", and a message that the graph expression data 137 is stored with the expression number "1", which is the same as that in Bob's scientific calculator 1B, is sent to Bob's scientific calculator 1B (Step S88)

When the first user (teacher) performs the operation to specify the region number "3" in the graph-related information storing table 133 (Step S51; YES), the specified region number "3" is displayed on the display 3 (Step S52), and display range data of the XY coordinate system shown by the view window data 134 under the specified region number "3" is set onto the image display region where the background image of the specified image data 132S is displayed (Step S54). At this point, in each scientific calculator 1B too, the display range data of the XY coordinate system shown by the view window data 134 under the specified region number "3"

of the scientific calculator 1A is set onto the image display region where the background image of the specified image data 132S is displayed.

Then, the graph expression data 137 "Y1=−0.1(x−3.5)²+4" is read from the graph expression data table 135 under the specified region number "3" in the graph-related information storing table 133, and a graph figure shown by the graph expression data 137 is displayed on the background image of the specified image data 132S (Step S55), and a graph expression for the graph figure, "Y1=−0.1(x−3.5)²+4", and the user name "Bob" correlated with the graph expression data 137 of the graph expression are displayed in the color which is the same as the color of the graph figure so that the graph expression and the user name are correlated with the graph figure (Step S56).

As described above, according to the scientific calculator 1 in the embodiment, as shown by Steps S51 to S56 in FIG. 4, and Step S82 in FIG. 5, and as shown in FIGS. 6A to 9C or the like, when, in a first scientific calculator 1, with respect to the XY coordinate system, predetermined display range data is set onto the image display region, where the background image of the specified image data 132S is displayed, of the display screen, the predetermined display range data is sent from the first scientific calculator 1 to a second scientific calculator 1, and, in the second scientific calculator 1 too, with respect to the XY coordinate system, the display range data is set onto the image display region, where the background image of the specified image data 132S is displayed, of the display screen. In addition, when graph expression data for a graph figure displayed on the background image of the second scientific calculator 1 is received from the second scientific calculator 1, the graph figure shown by the graph expression data is displayed on the background image of the first scientific calculator 1. Therefore, a plurality of scientific calculators 1 can have the same display range of the XY coordinate system, and can transmit/receive a graph expression for a graph figure displayed on the display range of the XY coordinate system to/from each other. Accordingly, a graph can be properly displayed in such a way as to fit a background image.

Furthermore, as shown by Step S56 in FIG. 4 and Step S81 in FIG. 5, and as shown in FIG. 6D or the like, when a first scientific calculator 1 receives graph expression data from a second scientific calculator 1, the first scientific calculator 1 receives a user name from the second scientific calculator 1, and displays the user name on the display 3. Accordingly, it can be recognized which second scientific calculator 1 sends the displayed graph figure.

Furthermore, as shown by Step S56 in FIG. 4, and as shown in FIG. 7B or the like, when a first scientific calculator 1 receives graph expression data and user names from a plurality of second scientific calculators 1, graph figures respectively shown by the graph expression data respectively sent from the second scientific calculators 1 and their respective user names are displayed in such a way as to be correlated with their respective graph figures. Accordingly, even when a plurality of graph figures is displayed, it can be recognized which second scientific calculator 1 sends each displayed graph figure.

Furthermore, as shown by Step S82 in FIG. 5, and as shown in FIG. 10C or the like, when a first scientific calculator 1 receives graph expression data from a second scientific calculator 1, the first scientific calculator 1 receives, from the second scientific calculator 1, display range data of the XY coordinate system set on the image display region of the second scientific calculator 1, and when the received display range based thereon and the set display range at this point of time are different, the first scientific calculator 1 is informed of that. Therefore, a graph figure created within a different display range can be prevented from being displayed. Accordingly, a graph can be properly displayed in such a way as to fit a background image for sure.

Needless to say, detailed configurations and operations of the components of the scientific calculator 1 in the embodiment can be appropriately modified without departing from the scope of the present invention.

For example, in the embodiment, the scientific calculator 1 is described as the image display terminal of the present invention. However, products to which the present invention is applicable are not limited thereto. The present invention is applicable to electronic devices in general, such as a mobile phone, a personal computer, a PDA (Personal Digital Assistant), and a game machine. Furthermore, the image display program 130 of the present invention may be stored in a memory card, a CD or the like which is attachable to the scientific calculator 1.

This application is based upon and claims the benefit of priority under 35 USC 119 of Japanese Patent Application No. 2011-186669 filed on Aug. 30, 2011, the entire disclosure of which, including the description, claims, drawings, and abstract, is incorporated herein by reference in its entirety.

What is claimed is:

1. An image display terminal comprising:
   an image display control unit which displays a background image in a display screen of the image display terminal;
   a display range setting unit which sets, with respect to a coordinate system determined by a plurality of coordinate axes, display range data to an image display region where the background image is displayed of the display screen;
   a display range sending unit which sends the set display range data to at least two other image display terminals;
   a graph expression receiving unit which receives from the other image display terminals, after the sent display range data is set to an image display region where the background image is displayed of the other image display terminals, graph expression data for a graph figure displayed on the background image of the other image display terminals, wherein the background image displayed on the image display terminal and the background image displayed on the other image display terminals are identical;
   a terminal information receiving unit which receives, from the other image display terminals, terminal information on the other image display terminals when the graph expression receiving unit receives the graph expression data from the other image display terminals;
   a terminal information display control unit which displays the received terminal information on the display screen; and
   a received graph display control unit which displays, on the background image, the graph figure shown by the graph expression data received by the graph expression receiving unit;
   wherein, when the graph expression receiving unit receives the graph expression data from each of the other image display terminals, and the terminal information receiving unit receives the terminal information from each of the other image display terminals, the received graph display control unit and the terminal information display control unit display the graph figure shown by the received graph expression data and the received terminal information in such a way that the graph figure and the terminal information are correlated with each other, with respect to each of the other image display terminals.

2. An image display terminal comprising:
an image display control unit which displays a background image in a display screen of the image display terminal;
a display range setting unit which sets, with respect to a coordinate system determined by a plurality of coordinate axes, display range data to an image display region where the background image is displayed of the display screen;
a display range sending unit which sends the set display range data to at least one other image display terminal;
a graph expression receiving unit which receives from the other image display terminal, after the sent display range data is set to an image display region where the background image is displayed of the other image display terminal, graph expression data for a graph figure displayed on the background image of the other image display terminal, wherein the background image displayed on the image display terminal and the background image displayed on the other image display terminal are identical;
a display range receiving unit which receives, from the other image display terminal, display range data set by the other image display terminal when the graph expression receiving unit receives the graph expression data from the other image display terminal; and
a display range difference informing unit which informs a user that the received display range data received by the display range receiving unit and the set display range data set by the display range setting unit are different, when the received display range data and the set display range data are different.

3. The image display terminal according to claim 2, further comprising a display range resetting unit which sets the received display range data to the image display region based on a user operation, when the received display range data and the set display range data are different.

4. The image display terminal according to claim 3, further comprising a display range/graph storage unit which correlates and stores the received graph expression data with the received display range data,
wherein the display range resetting unit includes:
a display range specifying unit which specifies display range data among the display range data stored by the display range/graph storage unit as specified display range data based on a user operation; and
a specified display range setting unit which sets the specified display range data to the image display region based on a user operation, and
the received graph display control unit displays, on the background image, the graph figure shown by the graph expression data correlated with the specified display range data by the display range/graph storage unit.

5. An image display control method for a computer of an image display terminal, the image display control method comprising:
displaying a background image in a display screen of the image display terminal;
setting, with respect to a coordinate system determined by a plurality of coordinate axes, display range data to an image display region where the background image is displayed of the display screen;
sending the set display range data to at least two other image display terminals;
receiving from the other image display terminals, after the sent display range data is set to an image display region where the background image is displayed of the other image display terminals, graph expression data for a graph figure displayed on the background image of the other image display terminals, wherein the background image displayed on the image display terminal and the background image displayed on the other image display terminals are identical;
receiving, from the other image display terminals, terminal information on the other image display terminals when the graph expression data is received from the other image display terminals;
displaying the received terminal information on the display screen; and
displaying, on the background image, the graph figure shown by the received graph expression data;
wherein, when the graph expression data is received from each of the other image display terminals, and the terminal information is received from each of the other image display terminals, the graph figure shown by the received graph expression data and the received terminal information is displayed in such a way that the graph figure and the terminal information are correlated with each other, with respect to each of the other image display terminals.

6. A non-transitory recording medium having stored thereon an image display control program for controlling a computer of an image display terminal to operate as:
an image display control unit which displays a background image in a display screen of the image display terminal;
a display range setting unit which sets, with respect to a coordinate system determined by a plurality of coordinate axes, display range data to an image display region where the background image is displayed of the display screen;
a display range sending unit which sends the set display range data to at least two other image display terminals;
a graph expression receiving unit which receives from the other image display terminals, after the sent display range data is set to an image display region where the background image is displayed of the other image display terminals, graph expression data for a graph figure displayed on the background image of the other image display terminals, wherein the background image displayed on the image display terminal and the background image displayed on the other image display terminals are identical;
a terminal information receiving unit which receives, from the other image display terminals, terminal information on the other image display terminals when the graph expression receiving unit receives the graph expression data from the other image display terminals;
a terminal information display control unit which displays the received terminal information on the display screen; and
a received graph display control unit which displays, on the background image, the graph figure shown by the graph expression data received by the graph expression receiving unit;
wherein, when the graph expression receiving unit receives the graph expression data from each of the other image display terminals, and the terminal information receiving unit receives the terminal information from each of the other image display terminals, the received graph display control unit and the terminal information display control unit display the graph figure shown by the received graph expression data and the received terminal information in such a way that the graph figure and the terminal information are correlated with each other, with respect to each of the other image display terminals.

7. An image display control method for a computer of an image display terminal, the image display control method comprising:
displaying a background image in a display screen of the image display terminal;
setting, with respect to a coordinate system determined by a plurality of coordinate axes, display range data to an image display region where the background image is displayed of the display screen;
sending the set display range data to at least one other image display terminal;
receiving from the other image display terminal, after the sent display range data is set to an image display region where the background image is displayed of the other image display terminal, graph expression data for a graph figure displayed on the background image of the other image display terminal, wherein the background image displayed on the image display terminal and the background image displayed on the other image display terminal are identical;
receiving, from the other image display terminal, display range data set by the other image display terminal when the graph expression data is received from the other image display terminal; and
informing a user that the received display range data and the set display range data are different, when the received display range data and the set display range data are different.

8. A non-transitory recording medium having stored thereon an image display control program for controlling a computer of an image display terminal to operate as:

an image display control unit which displays a background image in a display screen of the image display terminal;
a display range setting unit which sets, with respect to a coordinate system determined by a plurality of coordinate axes, display range data to an image display region where the background image is displayed of the display screen;
a display range sending unit which sends the set display range data to at least one other image display terminal;
a graph expression receiving unit which receives from the other image display terminal, after the sent display range data is set to an image display region where the background image is displayed of the other image display terminal, graph expression data for a graph figure displayed on the background image of the other image display terminal, wherein the background image displayed on the image display terminal and the background image displayed on the other image display terminal are identical;
a display range receiving unit which receives, from the other image display terminal, display range data set by the other image display terminal when the graph expression receiving unit receives the graph expression data from the other image display terminal; and
a display range difference informing unit which informs a user that the received display range data received by the display range receiving unit and the set display range data set by the display range setting unit are different, when the received display range data and the set display range data are different.

* * * * *